(12) United States Patent
Hutchinson et al.

(10) Patent No.: US 7,717,057 B2
(45) Date of Patent: May 18, 2010

(54) DIP, SPRAY, AND FLOW COATING PROCESS FOR FORMING COATED ARTICLES

(75) Inventors: Gerald A. Hutchinson, Coto De Caza, CA (US); Robert A. Lee, Bowdon (GB)

(73) Assignee: Sharon Hutchinson, Castle Rock, CO (US)

( * ) Notice: Subject to any disclaimer, the term of this patent is extended or adjusted under 35 U.S.C. 154(b) by 22 days.

(21) Appl. No.: 11/772,737

(22) Filed: Jul. 2, 2007

(65) Prior Publication Data

US 2008/0041304 A1 Feb. 21, 2008

Related U.S. Application Data

(60) Division of application No. 10/614,731, filed on Jul. 3, 2003, which is a continuation of application No. PCT/US03/22333, filed on Jul. 3, 2003.

(60) Provisional application No. 60/394,092, filed on Jul. 3, 2002, provisional application No. 60/422,251, filed on Oct. 28, 2002, provisional application No. 60/441,718, filed on Jan. 21, 2003.

(51) Int. Cl.
*B05C 3/02* (2006.01)
(52) U.S. Cl. .................... 118/412; 118/66; 118/313; 118/314; 118/DIG. 4
(58) Field of Classification Search ............ 118/DIG. 4, 118/64, 66, 603, 602, 412, 666, 313, 324, 118/314; 427/420, 240
See application file for complete search history.

(56) References Cited

U.S. PATENT DOCUMENTS

| | | | |
|---|---|---|---|
| 1,702,043 A * | 2/1929 | Leavenworth | 427/558 |
| 2,963,002 A * | 12/1960 | Glaus | 118/324 |
| 3,305,528 A | 2/1967 | Wynstra et al. | |
| 3,317,471 A | 5/1967 | Johnson et al. | |
| 3,395,118 A | 7/1968 | Reinking et al. | |
| 3,654,894 A * | 4/1972 | Rohrbacher et al. | 118/17 |
| 3,900,286 A | 8/1975 | Wegmann et al. | |
| 3,966,378 A | 6/1976 | Valyi | |
| 4,040,233 A | 8/1977 | Valyi | |
| 4,104,222 A | 8/1978 | Date et al. | |

(Continued)

FOREIGN PATENT DOCUMENTS

BR 9302624 5/1994

(Continued)

OTHER PUBLICATIONS

Database WPI Section Ch, Week 199533 Derwent Publications Ltd., London, GB AN 1995-251427 XP00215064 & JP 07 156349 A (Kureha Chem Ind. Co. Ltd.), Jun. 20, 1995 abstract.

(Continued)

*Primary Examiner*—Brenda A Lamb

(57) ABSTRACT

This invention relates to methods and apparatus for making coated articles with one or more layers by dip, spray or flow coating. In one aspect, this invention relates to an apparatus and method for making coated containers, preferably comprising polyethylene terephthalate, from coated preforms. In preferred embodiments, the apparatus and method permit the coated container or preform to be made in an energy-efficient manner that reduces the danger of coating damage and thus increases the efficacy of the final container.

15 Claims, 15 Drawing Sheets

U.S. PATENT DOCUMENTS

| | | |
|---|---|---|
| 4,127,633 A | 11/1978 | Addleman |
| 4,149,645 A | 4/1979 | Valyi |
| 4,225,650 A | 9/1980 | van Brederode et al. |
| 4,267,143 A | 5/1981 | Roullet |
| 4,370,368 A | 1/1983 | Hirata et al. |
| 4,381,277 A | 4/1983 | Nilsson |
| 4,393,106 A | 7/1983 | Maruhashi et al. |
| 4,403,090 A | 9/1983 | Smith |
| 4,436,764 A | 3/1984 | Nakazima et al. |
| 4,438,254 A | 3/1984 | Doorakian et al. |
| 4,461,857 A | 7/1984 | Sekmakas et al. |
| 4,478,874 A | 10/1984 | Hahn |
| 4,487,789 A | 12/1984 | Iwanami et al. |
| 4,499,262 A | 2/1985 | Fagerburg et al. |
| 4,505,951 A | 3/1985 | Kennedy |
| 4,515,836 A | 5/1985 | Cobbs et al. |
| 4,528,321 A | 7/1985 | Allen et al. |
| 4,534,995 A | 8/1985 | Pocock et al. |
| 4,538,542 A | 9/1985 | Kennon et al. |
| 4,543,909 A | 10/1985 | Sharpless |
| 4,544,698 A | 10/1985 | Roullet et al. |
| 4,560,741 A | 12/1985 | Davis et al. |
| 4,564,541 A | 1/1986 | Taira et al. |
| 4,569,869 A | 2/1986 | Kushida et al. |
| 4,573,429 A | 3/1986 | Cobbs et al. |
| 4,578,295 A | 3/1986 | Jabarin |
| 4,615,925 A | 10/1986 | Nilsson |
| 4,632,053 A | 12/1986 | Villanueva et al. |
| 4,646,925 A | 3/1987 | Nohara |
| 4,647,648 A | 3/1987 | Silvis et al. |
| 4,699,809 A | 10/1987 | Maruhashi et al. |
| 4,714,580 A | 12/1987 | Maruhashi et al. |
| 4,731,266 A | 3/1988 | Bonnebat et al. |
| 4,741,936 A | 5/1988 | Nohara et al. |
| 4,762,903 A | 8/1988 | Geist et al. |
| 4,764,405 A | 8/1988 | Bauman et al. |
| 4,809,640 A | 3/1989 | Pilley et al. |
| 4,818,575 A | 4/1989 | Hirata et al. |
| 4,847,129 A | 7/1989 | Collette et al. |
| 4,871,410 A | 10/1989 | Bonnebat et al. |
| 4,940,616 A | 7/1990 | Yatsu et al. |
| 4,977,191 A | 12/1990 | Salsman |
| 4,980,211 A | 12/1990 | Kushida |
| 5,006,381 A | 4/1991 | Nugent, Jr. et al. |
| 5,028,462 A | 7/1991 | Matlack et al. |
| 5,053,257 A | 10/1991 | Hasegawa et al. |
| 5,079,034 A | 1/1992 | Miyake et al. |
| 5,089,588 A | 2/1992 | White et al. |
| 5,115,075 A | 5/1992 | Brennan et al. |
| 5,134,218 A | 7/1992 | Brennan et al. |
| 5,136,970 A * | 8/1992 | Saito et al. .................. 118/324 |
| 5,143,998 A | 9/1992 | Brennan et al. |
| 5,149,768 A | 9/1992 | White et al. |
| 5,164,472 A | 11/1992 | White et al. |
| 5,171,820 A | 12/1992 | Mang et al. |
| 5,184,373 A | 2/1993 | Lange |
| 5,196,469 A | 3/1993 | Cushing et al. |
| 5,218,075 A | 6/1993 | Brennan et al. |
| 5,275,853 A | 1/1994 | Silvis et al. |
| 5,281,630 A | 1/1994 | Salsman |
| RE34,537 E | 2/1994 | Deyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,314,751 A | 5/1994 | Nield et al. |
| 5,328,724 A | 7/1994 | Deak |
| 5,409,983 A | 4/1995 | Jones et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,505,995 A | 4/1996 | Leonard |
| 5,509,965 A | 4/1996 | Harry et al. |
| 5,637,365 A | 6/1997 | Carlblom |
| 5,639,848 A | 6/1997 | Nugent, Jr. et al. |
| 5,645,183 A | 7/1997 | Slat et al. |
| 5,646,924 A | 7/1997 | Nonoyama et al. |
| 5,667,886 A | 9/1997 | Gough et al. |
| 5,676,267 A | 10/1997 | Slat et al. |
| 5,716,683 A | 2/1998 | Harvey et al. |
| 5,726,277 A | 3/1998 | Salsman |
| 5,731,094 A | 3/1998 | Brennan et al. |
| 5,749,970 A | 5/1998 | Fukuta et al. |
| 5,753,358 A | 5/1998 | Korleski |
| 5,759,653 A | 6/1998 | Collette et al. |
| 5,759,654 A | 6/1998 | Cahill |
| 5,759,656 A | 6/1998 | Collette et al. |
| 5,780,128 A | 7/1998 | Farha |
| 5,798,183 A | 8/1998 | Hosono et al. |
| 5,804,305 A | 9/1998 | Slat et al. |
| 5,814,373 A | 9/1998 | White et al. |
| 5,834,078 A | 11/1998 | Cavitt et al. |
| 5,857,562 A | 1/1999 | Evrard |
| 5,939,188 A | 8/1999 | Moncur et al. |
| 5,939,516 A | 8/1999 | Greaves et al. |
| 5,942,563 A | 8/1999 | DeGraaf |
| 5,968,620 A | 10/1999 | Harvey et al. |
| 5,972,445 A | 10/1999 | Kimura et al. |
| 5,989,661 A | 11/1999 | Krishnakumar et al. |
| 6,004,680 A | 12/1999 | Abed et al. |
| 6,011,111 A | 1/2000 | Brennan et al. |
| 6,068,900 A | 5/2000 | Kohn et al. |
| 6,086,991 A | 7/2000 | Hubbard et al. |
| 6,090,460 A | 7/2000 | Collette et al. |
| 6,109,006 A | 8/2000 | Hutchinson |
| 6,121,387 A | 9/2000 | Choudhery |
| 6,123,211 A | 9/2000 | Rashid et al. |
| 6,129,784 A * | 10/2000 | Ikuta et al. .................. 106/417 |
| 6,156,806 A | 12/2000 | Piechocki et al. |
| 6,159,294 A * | 12/2000 | Kuster et al. .................. 118/642 |
| 6,180,715 B1 | 1/2001 | Schmidt |
| 6,184,281 B1 | 2/2001 | Craun et al. |
| 6,218,013 B1 | 4/2001 | Wood et al. |
| 6,280,679 B1 | 8/2001 | Rashid et al. |
| 6,299,944 B1 | 10/2001 | Trapani |
| 6,309,757 B1 | 10/2001 | Carlblom et al. |
| 6,312,641 B1 | 11/2001 | Hutchinson |
| 6,315,549 B1 | 11/2001 | Jenko et al. |
| 6,319,574 B1 | 11/2001 | Slat |
| 6,346,596 B1 | 2/2002 | Mallen et al. |
| 6,350,796 B1 | 2/2002 | Dworak et al. |
| 6,352,426 B1 | 3/2002 | Hutchinson et al. |
| 6,372,318 B1 | 4/2002 | Collette et al. |
| 6,391,408 B1 | 5/2002 | Hutchinson |
| 6,391,946 B2 | 5/2002 | Wood et al. |
| 6,393,803 B1 | 5/2002 | Luka et al. |
| 6,403,231 B1 | 6/2002 | Mueller et al. |
| 6,418,636 B1 * | 7/2002 | Sonner .................. 34/86 |
| 6,426,135 B1 | 7/2002 | Kotani et al. |
| 6,455,116 B1 | 9/2002 | Xia et al. |
| 6,455,620 B1 | 9/2002 | Cyr et al. |
| 6,461,697 B1 | 10/2002 | Slat et al. |
| 6,461,699 B1 | 10/2002 | Slat et al. |
| 6,475,579 B1 | 11/2002 | Slat |
| 6,489,387 B2 | 12/2002 | Mallya et al. |
| 6,495,226 B1 | 12/2002 | Slat |
| 6,515,067 B2 | 2/2003 | Cai et al. |
| 6,524,672 B1 | 2/2003 | Slat et al. |
| 6,551,400 B2 | 4/2003 | Hasbe et al. |
| 6,592,956 B2 | 7/2003 | Slat |
| 6,673,874 B1 | 1/2004 | Choudhery |
| 6,676,883 B2 | 1/2004 | Hutchinson et al. |
| 6,709,735 B2 | 3/2004 | Posey et al. |
| 6,709,759 B2 | 3/2004 | Mueller et al. |
| 6,723,431 B2 | 4/2004 | Mallory et al. |

| | | | |
|---|---|---|---|
| 6,746,769 B2 | 6/2004 | Slat | |
| 6,863,988 B2 | 3/2005 | Tibbitt et al. | |
| 6,872,802 B2 | 3/2005 | Noda | |
| 6,893,730 B2 | 5/2005 | Moulton et al. | |
| 6,946,175 B2 | 9/2005 | Yang et al. | |
| 6,982,119 B2 | 1/2006 | Shi et al. | |
| 6,989,181 B2 | 1/2006 | Brandt | |
| 7,072,248 B2 | 7/2006 | Gohil | |
| 2001/0030163 A1 | 10/2001 | Rashid et al. | |
| 2002/0001686 A1 | 1/2002 | Kashiba et al. | |
| 2002/0028870 A1 | 3/2002 | Lan et al. | |
| 2002/0048682 A1 | 4/2002 | Subramanian et al. | |
| 2002/0061371 A1 | 5/2002 | Schmidt et al. | |
| 2002/0090473 A1 | 7/2002 | Lee et al. | |
| 2002/0155236 A1 | 10/2002 | Cahill et al. | |
| 2002/0160210 A1 | 10/2002 | Kiik et al. | |
| 2003/0001315 A1 | 1/2003 | Hutchinson et al. | |
| 2003/0012904 A1 | 1/2003 | Hutchinson et al. | |
| 2003/0031814 A1 | 2/2003 | Hutchinson et al. | |
| 2003/0219555 A1 | 11/2003 | Hutchinson et al. | |
| 2003/0220036 A1 | 11/2003 | Lee et al. | |
| 2004/0247735 A1 | 12/2004 | Hutchinson et al. | |

FOREIGN PATENT DOCUMENTS

| | | |
|---|---|---|
| EP | 0 099 727 A2 | 2/1984 |
| EP | 0 203 630 A2 | 12/1986 |
| EP | 0 105 826 | 3/1987 |
| EP | 0 225 049 A2 | 6/1987 |
| EP | 0 302 117 A1 | 2/1989 |
| EP | 0 180 191 | 7/1989 |
| EP | 0 368 278 A2 | 5/1990 |
| EP | 0 395 237 A1 | 10/1990 |
| EP | 0 218 245 B1 | 5/1991 |
| EP | 0 153 120 | 12/1991 |
| EP | 0 605 537 B1 | 7/1994 |
| EP | 0 376 469 B1 | 3/1995 |
| EP | 0 689 933 A2 | 1/1996 |
| EP | 0 822 213 A1 | 2/1998 |
| GB | 2 159 441 | 12/1985 |
| JP | 60-170672 A2 | 9/1985 |
| JP | 07-156349 | 6/1995 |
| WO | WO 87/02680 | 5/1987 |
| WO | WO 90/07553 | 7/1990 |
| WO | WO 91/08099 | 6/1991 |
| WO | WO 93/07068 | 4/1993 |
| WO | WO 95/06680 | 3/1995 |
| WO | WO 95/22451 | 8/1995 |
| WO | WO 95/34425 | 12/1995 |
| WO | WO 96/08371 | 3/1996 |
| WO | WO 97/02939 | 1/1997 |
| WO | WO 97/26127 | 7/1997 |
| WO | WO 97/28218 | 8/1997 |
| WO | WO 97/42250 | 11/1997 |
| WO | WO 98/02479 | 1/1998 |
| WO | WO 98/14498 | 4/1998 |
| WO | WO 98/17470 | 4/1998 |
| WO | WO 98/29491 | 7/1998 |
| WO | WO 99/12995 | 3/1999 |
| WO | WO 99/20462 A2 | 4/1999 |
| WO | WO 99/20462 A3 | 4/1999 |
| WO | WO 99/25533 | 5/1999 |
| WO | WO 99/38914 | 8/1999 |
| WO | WO 99/48962 | 9/1999 |
| WO | WO 00/03922 | 1/2000 |
| WO | WO 00/37321 | 6/2000 |
| WO | WO 00/44819 | 8/2000 |
| WO | WO 00/62998 | 10/2000 |
| WO | WO 01/53062 | 7/2001 |
| WO | WO 01/57124 | 8/2001 |
| WO | WO 01/83193 | 11/2001 |
| WO | WO 02/16484 A2 | 2/2002 |
| WO | WO 02/16484 A3 | 2/2002 |
| WO | WO 02/16485 A2 | 2/2002 |
| WO | WO 02/16485 A3 | 2/2002 |
| WO | WO 02/20246 | 3/2002 |
| WO | WO 02/088232 | 11/2002 |
| WO | WO 03/080731 | 10/2003 |
| WO | WO 2004/043675 | 5/2004 |
| WO | WO 2005/019355 A1 | 3/2005 |

OTHER PUBLICATIONS

Database WPI Section Ch. Week 199805 Derwent Publications Ltd., London, GB, AN 1998-047013 XP002150646 & JP 09 0296056 A (Nipon Ester Co. Ltd), Nov. 18, 1997 abstract.

Dow Plastics Product Information, "Blox 0000 and 4000 Series." pp. 1-4 (2000).

International Preliminary Examination Report dated Oct. 13, 2004 for International Application No. PCT/US03/22333, filed Jul. 3, 2003.

International Search Report dated Oct. 27, 2003 for International Application No. PCT/US03/22333, filed Jul. 3, 2003.

Reinking et al., "Polyhydroxyethers. 1. Effect of Structures On Properties Of High Molecular Weight Polymers From Dihydric Phenols and Epichlorohydrin." J.App. Polymer Sci. 7(6):2135-2144 (1963).

* cited by examiner

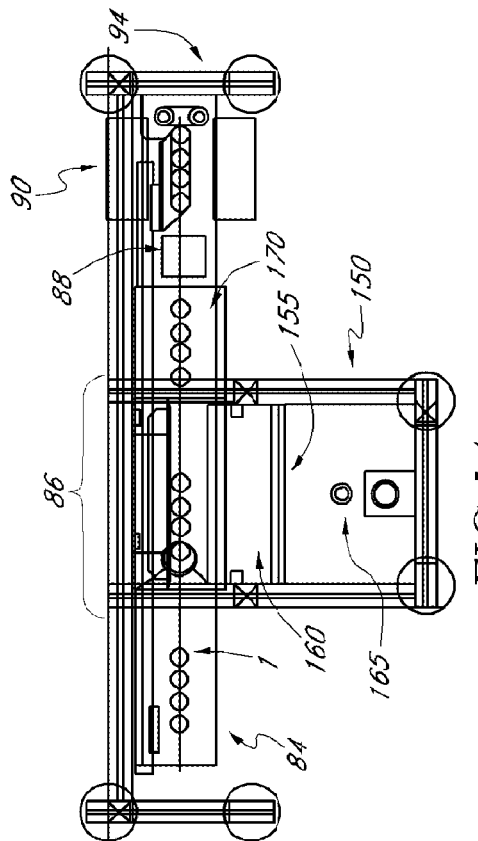
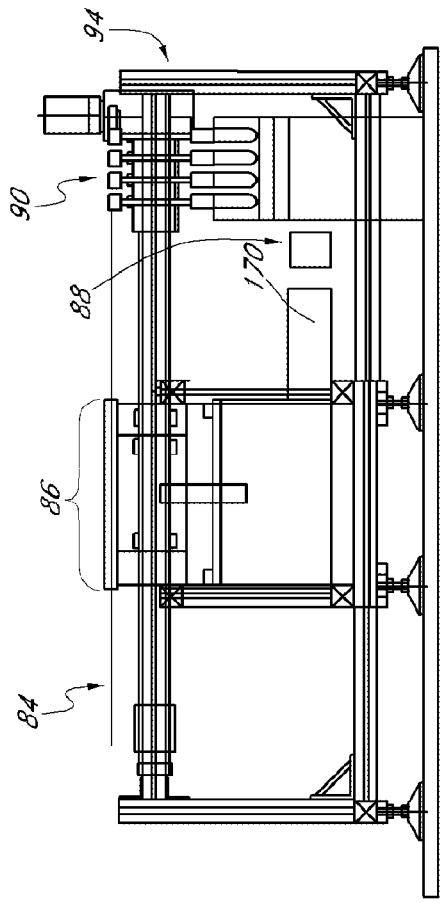
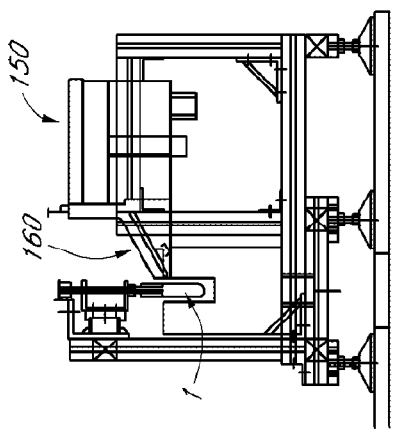
FIG.14
FIG.15
FIG.16

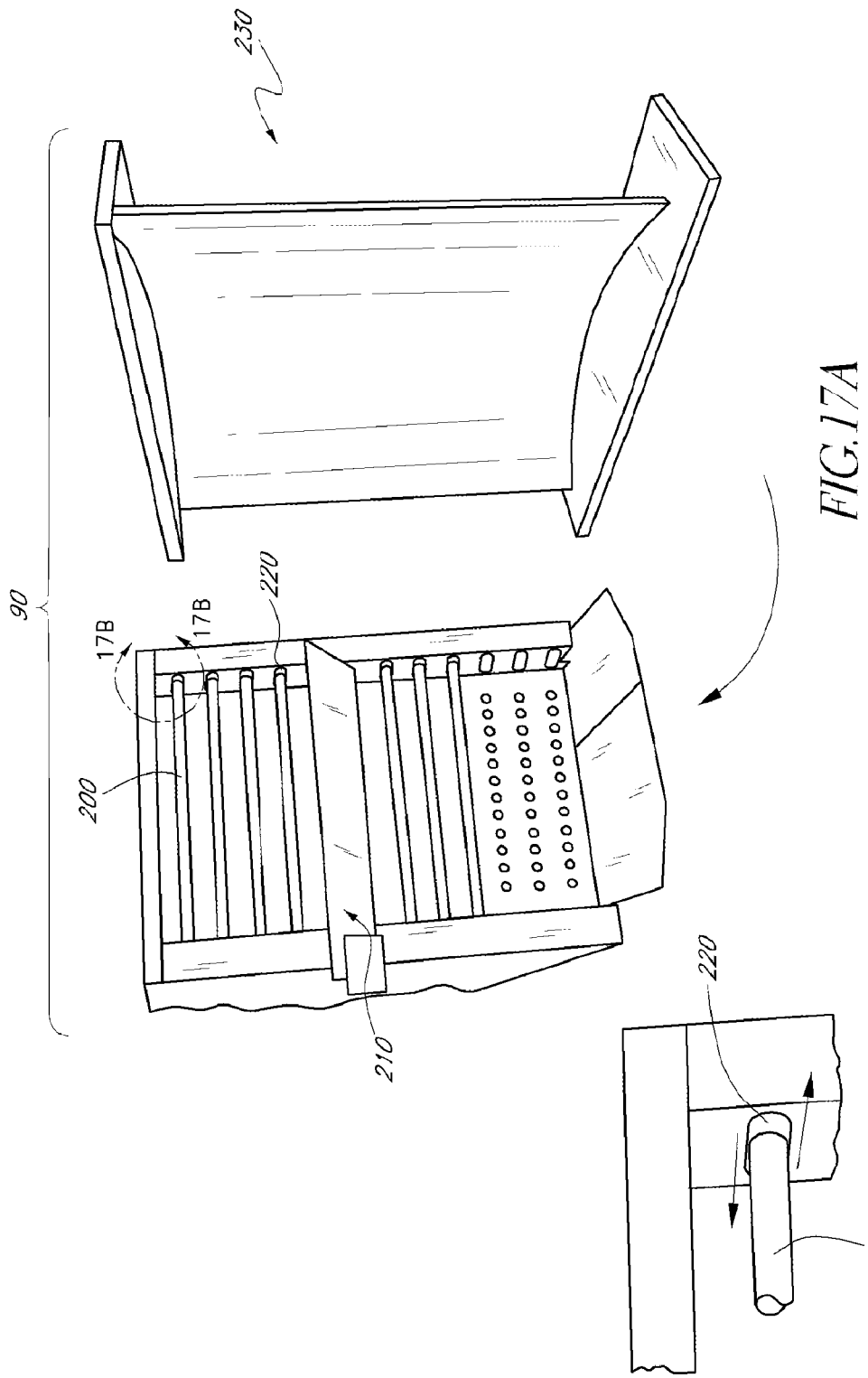

DIP, SPRAY, AND FLOW COATING PROCESS FOR FORMING COATED ARTICLES

CROSS-REFERENCE TO RELATED APPLICATIONS

This application is a divisional of U.S. patent application Ser. No. 10/614,731 filed Jul. 3, 2003, currently pending, which is a continuation of PCT/US03/22333, filed Jul. 3, 2003, and which claims priority to provisional applications Ser. No. 60/394,092 filed Jul. 3, 2002, Ser. No. 60/422,251 filed Oct. 28, 2002, and Ser. No. 60/441,718 filed Jan. 21 2003. All of these prior applications are hereby expressly incorporated by reference in their entireties.

BACKGROUND OF THE INVENTION

1. Field of the Invention

This invention relates to methods and apparatus for making coated articles with one or more layers by dip, spray or flow coating. In one aspect, this invention relates to an apparatus and method for making coated containers, preferably comprising polyethylene terephthalate, from coated preforms.

2. Description of the Related Art

Preforms are the products from which containers are made by blow molding. Unless otherwise indicated the term "container" is a broad term and is used in its ordinary sense and includes, without limitation, both the preform and bottle container therefrom. A number of plastic and other materials have been used for containers and many are quite suitable. Some products such as carbonated beverages and foodstuffs need a container, which is resistant to the transfer of gases such as carbon dioxide and oxygen. Coating of such containers has been suggested for many years. A resin now widely used in the container industry is polyethylene terephthalate (PET), by which term we include not only the homopolymer formed by the polycondensation of [beta]-hydroxyethyl terephthalate but also copolyesters containing minor amounts of units derived from other glycols or diacids, for example isophthalate copolymers.

The manufacture of biaxially oriented PET containers is well known in the art. Biaxially oriented PET containers are strong and have good resistance to creep. Containers of relatively thin wall and light weight can be produced that are capable of withstanding, without undue distortion over the desired shelf life, the pressures exerted by carbonated liquids, particularly beverages such as soft drinks, including colas, and beer.

Thin-walled PET containers are permeable to some extent to gases such as carbon dioxide and oxygen and hence permit loss of pressurizing carbon dioxide and ingress of oxygen which may affect the flavor and quality of the bottle contents. In one method of commercial operation, preforms are made by injection molding and then blown into bottles. In the commercial two-liter size, a shelf life of 12 to 16 weeks can be expected but for smaller bottles, such as half liter, the larger surface-to-volume ratio severely restricts shelf life. Carbonated beverages can be pressured to 4.5 volumes of gas but if this pressure falls below acceptable product specific levels, the product is considered unsatisfactory.

It is therefore desirable to provide the container with a layer of a barrier material which has a low vapor and gas permeability. Barrier layers may be provided by a variety of techniques, including coinjection, chemical vapor deposition, plasma coating with amorphous carbon and/or SiOx, etc., so as to form a laminar coated container. Other examples involve the use of an aqueous dispersion of barrier polymers, and have included dispersions made from vinylidene chloride with acrylonitrile and/or methyl acrylate, optionally containing units derived from other monomers such as methyl methacrylate, vinyl chloride, acrylic acid, or itaconic acid, dispersions made from EVOH and MXD6, etc. The dispersions typically contained surfactants such as sodium alkyl sulphonates.

SUMMARY OF THE INVENTION

In one aspect, this invention relates to methods and apparatus for making articles, preferably plastic articles, having coatings comprising one or more layers. These layers may comprise thermoplastic materials with good gas-barrier characteristics as well as layers that provide UV protection, scuff resistance, blush resistance, chemical resistance, and/or active properties such as $O_2$ or $CO_2$ scavenging.

In a preferred embodiment, there is provided a process for the production of a coated article. The process comprises providing an article, preferably a container or preform comprising polyethylene terephthalate; applying to said article a coating of an aqueous dispersion of a thermoplastic epoxy resin to the article; and curing/drying the coating. In embodiments where the article is a preform, the method preferably further comprises a blow molding operation, preferably including stretching the dried coated preform axially and radially, in a blow molding process, at a temperature suitable for orientation, into a bottle-container. In the process the thermoplastic epoxy coating is applied by dip, spray, or flow coating of the article and the coating and drying is applied in more than one pass such that the coating properties are increased with each coating layer. The volume of coating deposition may be altered by the article temperature, the article angle, the solution/dispersion temperature, the solution/dispersion viscosity and the number of layers. The multiple coatings of preferred processes result in multiple layers with substantially no distinction between layers, improved coating performance and/or reduction of surface voids and coating holidays. In addition, a preferred multiple coating process results in successive layers requiring decreasing amounts of coating material to thoroughly coat the article.

In preferred embodiments, the coating and drying process results in enhanced surface tension properties. Furthermore, in preferred processes, the drying process of articles has a repairing effect on surface defects of the finished article. In addition, in preferred processes, the drying/curing process produces articles which exhibit substantially no blushing.

In accordance with one embodiment, there is provided a process for making thermoplastic resin coated articles, the process comprising: applying an aqueous solution or dispersion of a first thermoplastic resin on the outer surface of an article substrate by dip, spray, or flow coating; withdrawing the article from the dip, spray, or flow coating at a rate so as to form a first coherent film; curing/drying the coated article until the first film is substantially dried so as to form a first coating. Optionally, the method may further include applying an aqueous solution or dispersion of a second thermoplastic resin on the outer surface of an article substrate by dip, spray, or flow coating; withdrawing the article from the dip, spray, or flow coating at a rate so as to form a second coherent film; curing/drying the coated article until the second film is substantially dried so as to form a second coating. In preferred embodiments, at least one of the first and second thermoplastic resins comprises a thermoplastic epoxy resin, and the first and second resins may be the same or different.

In accordance with a preferred embodiment, a method for dip coating articles is provided comprising the steps of: a) dipping the article into an aqueous coating solution/dispersion contained either in a static vat or in a flow coater with the article rotating to achieve full exposure to the flow; b) withdrawing the article from the static vat or flow coater below the rate at which a coherent film is observed; and c) exposing the article and film to infrared heaters until the film is substantially dried, optionally while cooling the article with air.

In accordance with a preferred embodiment, an apparatus for dip coating articles is provided comprising: an article conveyor that transports the articles through a dip coating system; a tank or vat containing an aqueous solution/dispersion coating material wherein the conveyor draws or dips the articles through the tank or vat; and a curing/drying unit which comprises an oven or chamber in which a curing/drying source is located, wherein the articles are moved through the oven or chamber by the conveyor. The curing/drying unit is optionally coupled with a fan or blower for cooling the article with air. A preferred apparatus may further comprise a second tank or vat of coating material and a second curing/drying unit. In another preferred apparatus, the conveyor transports the articles back through the tank and/or the curing/drying unit to provide a second coating on the article. A preferred apparatus may optionally include one or more drip removers positioned between the coating tank or vat and the curing/drying unit, or elsewhere before the curing/drying unit.

In accordance with another preferred embodiment, a method for coating articles is provided comprising the steps of: a) spray coating the article with an aqueous coating solution/dispersion with the article rotating to achieve full exposure to the flow, b) spraying the article at a rate which a coherent film is observed; and c) exposing the article and film to infrared heaters until the film is substantially dried; optionally while cooling the article with air.

In accordance with a preferred embodiment, an apparatus for spray coating articles is provided comprising: an article conveyor that transports the articles through a spray coating system; one or more spray nozzles is in fluid communication with an aqueous solution/dispersion of coating material, such as may be contained in a tank or vat; a coating material collector which receives unused coating material; and a curing/drying unit which comprises an oven or chamber in which a curing/drying source is located, wherein the articles are moved through the oven or chamber by the conveyor. The curing/drying unit is optionally coupled with a fan or blower for cooling the article with air. A preferred apparatus may further comprise a second tank or vat of coating material, a second grouping of one or more spray nozzles, and/or a second curing/drying unit, or, in providing a second coating, one or more components of the first spray coating system may be used. A preferred apparatus may optionally include one or more drip removers positioned between the sprayer and the curing/drying unit, or elsewhere before the curing/drying unit.

In accordance with another preferred embodiment, a method for flow coating articles is provided comprising the steps of: a) flow coating the article with an aqueous coating solution/dispersion with the article rotating to achieve full exposure to the flow, b) withdrawing the article from sheet of the flow coating at a rate which a coherent film is observed; c) exposing the article and film to infrared heaters until the film is substantially dried; and optionally d) cooling the article with air.

In accordance with a preferred embodiment, an apparatus for flow coating articles is provided comprising: an article conveyor that transports the articles through a flow coating system; a tank or vat containing an aqueous solution/dispersion of coating material that is in fluid communication with a fluid guide, wherein the coating material flows off of the fluid guide forming a sheet or falling shower curtain; a coating material collector which receives unused coating material; and a curing/drying unit which comprises an oven or chamber in which a curing/drying source is located, wherein the articles are moved through the oven or chamber by the conveyor. The curing/drying unit is optionally coupled with a fan or blower for cooling the article with air. A preferred apparatus may further comprise a second tank or vat of coating material, a second fluid guide, and/or a second curing/drying unit, or, in providing a second coating, one or more components of the first flow coating system may be used. A preferred apparatus may optionally include one or more drip removers positioned between the coating tank or vat and the curing/drying unit, or elsewhere before the curing/drying unit.

In one embodiment, a preferred apparatus includes means for entry of the article into the system; dip, spray, or flow coating of the article; optionally removal of excess material; drying or curing; optionally, cooling, during and/or after drying/curing, and ejection from the system. In one embodiment the apparatus is a single integrated processing line that contains multiple stations wherein each station coats the article thereby producing a article with multiple coatings. In another embodiment, the system is modular wherein each processing line is self-contained with the ability to handoff to another line, thereby allowing for single or multiple coatings depending on how many modules are connected thereby allowing maximum processing flexibility.

In accordance with one embodiment, there is provided a multilayer article comprising: a substrate, and at least one layer comprising thermoplastic epoxy resin coating material disposed on at least a portion of said substrate to form a coated article, wherein the coated article preferably exhibits substantially no blushing or whitening when immersed in water or otherwise directly exposed to water. In preferred embodiments, such articles also exhibit substantially no blushing or whitening when exposed to high humidity, including humidity of about 70% or higher. Such exposure or immersion to water or high humidity may occur for several hours or longer, including about 6 hours, 12 hours, 24 hours, 48 hours, and longer and/or may occur at temperatures around room temperature and at reduced temperatures. In one embodiment, the coated articles exhibit substantially no blushing or whitening when immersed in or otherwise exposed directly to water at a temperature of about 0° C. to 30° C., including about 5° C., 10° C., 15° C., 20° C., 22° C., and 25° C. for about 24 hours. In preferred embodiments, the substrate comprises a polymeric material, preferably a thermoplastic material chosen from the group consisting of polyester, polypropylene, polyethylene, polycarbonate, polyamides and acrylics. In embodiments wherein the article is a preform or bottle having a body portion and neck portion, the coating is preferably disposed substantially only on the body portion of the preform. In a preferred embodiment, one or more additional coating layers are disposed on the article. In such three or more layer embodiments, preferably there is substantially no distinction between coating layers, and/or one or more additional layers comprise thermoplastic materials. The coating layer(s) may contain one or more of the following characteristics in preferred embodiments: gas-barrier protection, UV protection, scuff resistance, blush resistance, chemical resistance.

In accordance with a preferred embodiment a multilayer container is produced, preferably a preform or bottle having a body portion and neck portion. Preferably the container, preform or bottle comprises a thermoplastic material substrate and one or more, layers of thermoplastic resin coating material. Preferably the thermoplastic substrate material is chosen from the chosen from the group consisting of polyesters, polyolefins, polycarbonates, polyamides and acrylics. Preferably the coating layers contain one or more of the following characteristics: gas-barrier protection, UV protection, scuff resistance, blush resistance, chemical resistance. Preferably the coating is disposed substantially only on the body portion of the preform. In addition, the finished product preferably has substantially no distinction between layers.

In a preferred embodiment, the coated article or container formed from a coated preform shows substantially no blushing or whitening when exposed to water or high humidity at room temperature or reduced or elevated temperatures (with respect to room temperature) for a period of several hours or longer. In one embodiment, the coated article or container exhibits substantially no blushing when immersed in or otherwise exposed to water. In related embodiments, the infrared heating is replaced with flame curing, gas heaters, electron beam processing, or UV radiation optionally followed by or combined with cooling with air.

All of these embodiments are intended to be within the scope of the invention herein disclosed. These and other embodiments of the present inventions will become readily apparent to those skilled in the art from the following detailed description of a preferred embodiments having reference to the attached figures, the invention not being limited to any particular preferred embodiment(s) disclosed.

BRIEF DESCRIPTION OF THE DRAWINGS

FIG. 14 is a non-limiting top view of one embodiment of a preferred process wherein the system comprises a single flow coating unit.

FIG. 15 is a non-limiting front view of one embodiment of a preferred process wherein the system comprises a single flow coating unit.

FIG. 16 is a non-limiting cross section view of one embodiment of a preferred process wherein the system comprises a single flow coating unit.

FIGS. 17A and 17B depict non-limiting views of one embodiment of a preferred IR drying/curing unit.

DETAILED DESCRIPTION OF THE PREFERRED EMBODIMENT

Figure 1:
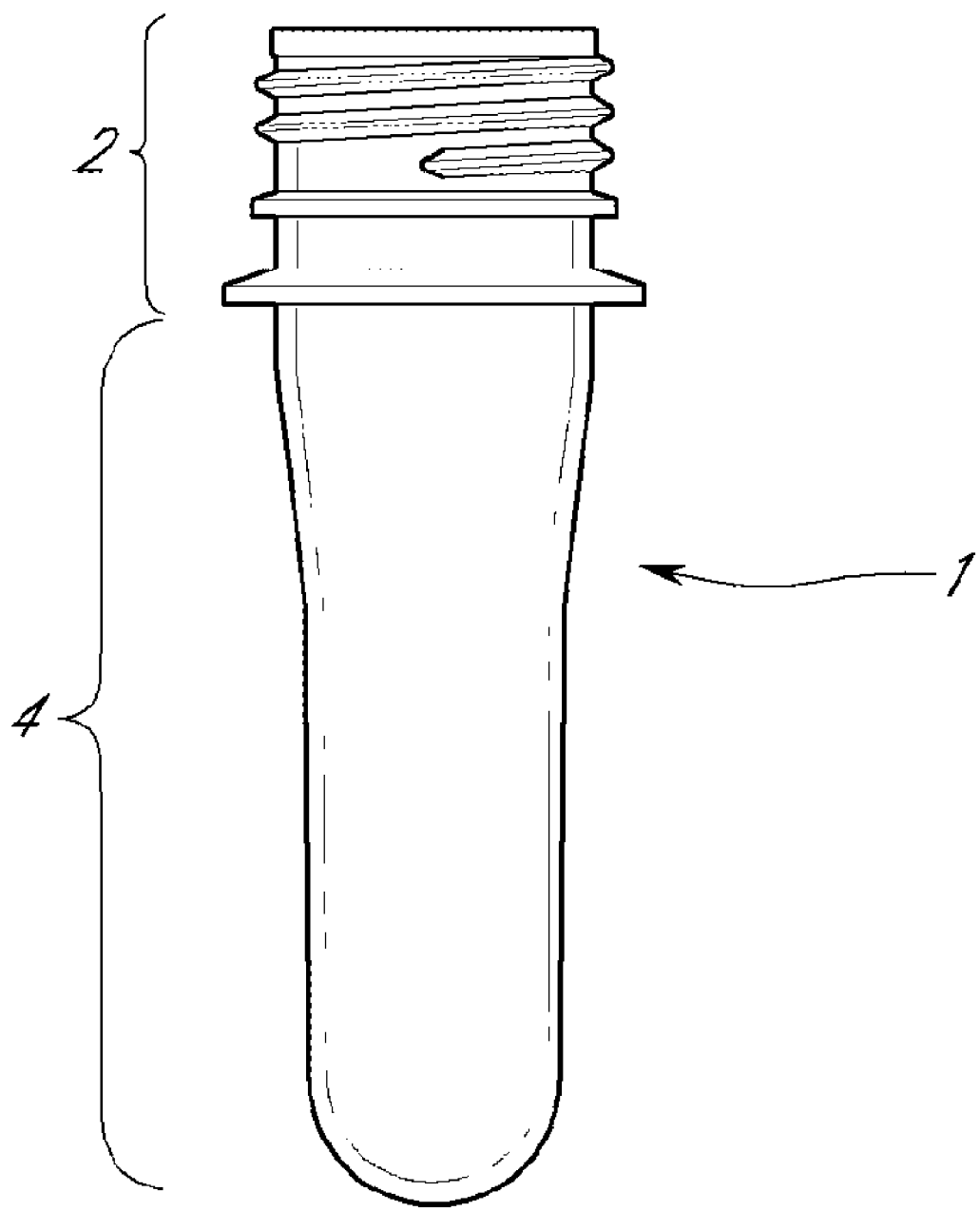
FIG. 1 is an uncoated preform as is used as a starting material for preferred embodiments.

Methods and apparatus for coating articles comprising one or more layers are described herein. These layers may comprise thermoplastic materials with good gas-barrier characteristics as well as layers or additives that provide UV protection, scuff resistance, blush resistance, chemical resistance, and/or active properties for $O_2$ and/or $CO_2$ scavenging.

As presently contemplated, one embodiment of a coated article is a preform of the type used for beverage containers. Alternatively, embodiments of the coated articles of the present invention could take the form of jars, tubes, trays, bottles for holding liquid foods, medical products, or other products sensitive to gas exposure. However, for the sake of simplicity, these embodiments will be described herein primarily as articles or preforms.

Furthermore, the articles described herein may be described specifically in relation to a particular substrate, polyethylene terephthalate (PET), but preferred methods are applicable to many other thermoplastics of the polyester type. As used herein, the term "substrate" is a broad term used in its ordinary sense and includes embodiments wherein "substrate" refers to the material used to form the base article that is coated. Other suitable article substrates include, but are not limited to, various polymers such as polyesters, polyolefins, including polypropylene and polyethylene, polycarbonate, polyamides, including nylons, or acrylics. These substrate materials may be used alone or in conjunction with each other. More specific substrate examples include, but are not limited to, polyethylene 2,6- and 1,5-naphthalate (PEN), PETG, polytetramethylene 1,2-dioxybenzoate and copolymers of ethylene terephthalate and ethylene isophthalate.

In one embodiment, PET is used as the polyester substrate which is coated. As used herein, "PET" includes, but is not limited to, modified PET as well as PET blended with other materials. One example of a modified PET is "high IPA PET" or IPA-modified PET. The term "high IPA PET" refers to PET in which the IPA content is preferably more than about 2% by weight, including about 2-10% IPA by weight.

One or more layers of a coating material are employed in preferred methods and processes. The layers may comprise barrier layers, UV protection layers, oxygen scavenging layers, carbon dioxide scavenging layers, and other layers as needed for the particular application. As used herein, the terms "barrier material," "barrier resin," and the like are broad terms and are used in their ordinary sense and refer, without limitation, to materials which, when used to coat articles, preferably adhere well to the article substrate and have a lower permeability to oxygen and carbon dioxide than the article substrate. As used herein, the terms "UV protection" and the like are broad terms and are used in their ordinary sense and refer, without limitation, to materials which, when used to coat articles, preferably adhere well to the article substrate and have a higher UV absorption rate than the article substrate. As used herein, the terms "oxygen scavenging" and the like are broad terms and are used in their ordinary sense and refer, without limitation, to materials which, when used to coat articles, preferably adhere well to the article substrate and have a higher oxygen absorption rate than the article substrate. As used herein, the terms "carbon dioxide scavenging" and the like are broad terms and are used in their ordinary sense and refer, without limitation, to materials which, when used to coat articles, preferably adhere well to the article substrate and have a higher carbon dioxide absorption rate than the article substrate. As used herein, the terms "crosslink," "crosslinked," and the like are broad terms and are used in their ordinary sense and refer, without limitation, to materials and coatings which vary in degree from a very small degree of crosslinking up to and including fully cross linked materials such as a thermoset epoxy. The degree of crosslinking can be adjusted to provide the appropriate degree of chemical or mechanical abuse resistance for the particular circumstances.

Once a suitable coating material is chosen, an apparatus and method for commercially manufacturing a coated article is necessary. One such method and apparatus is described below.

Preferred methods provide for a coating to be placed on an article, specifically a preform, which is later blown into a bottle. Such methods are, in many instances, preferable to placing coatings on the bottles themselves. Preforms are smaller in size and of a more regular shape than the containers blown therefrom, making it simpler to obtain an even and regular coating. Furthermore, bottles and containers of varying shapes and sizes can be made from preforms of similar size and shape. Thus, the same equipment and processing can be used to coat preforms to form several different types of containers. The blow-molding may take place soon after molding and coating, or preforms may be made and stored for later blow-molding. If the preforms are stored prior to blow-molding, their smaller size allows them to take up less space in storage. Even though it is often times preferable to form containers from coated preforms, containers may also be coated.

The blow-molding process presents several challenges. One step where the greatest difficulties arise is during the blow-molding process where the container is formed from the preform. During this process, defects such as delamination of the layers, cracking or crazing of the coating, uneven coating thickness, and discontinuous coating or voids can result. These difficulties can be overcome by using suitable coating materials and coating the preforms in a manner that allows for good adhesion between the layers.

Thus, preferred embodiments comprise suitable coating materials. When a suitable coating material is used, the coating sticks directly to the preform without any significant delamination and will continue to stick as the preform is blow-molded into a bottles and afterwards. Use of a suitable coating material also helps to decrease the incidence of cosmetic and structural defects which can result from blow-molding containers as described above.

One common problem seen in articles formed by coating using coating solutions or dispersions is "blushing" or whitening when the article is immersed in (which includes partial immersion) or exposed directly to water or high humidity (which includes at or above about 70% relative humidity). In preferred embodiments, the articles disclosed herein and the articles produced by methods disclosed herein exhibit minimal or substantially no blushing or whitening when immersed in or otherwise exposed directly to water or high humidity. Such exposure may occur for several hours or longer, including about 6 hours, 12 hours, 24 hours, 48 hours, and longer and/or may occur at temperatures around room temperature and at reduced temperatures, such as would be seen by placing the article in a cooler containing ice or ice water. Exposure may also occur at an elevated temperature, such elevated temperature generally not including temperatures high enough to cause an appreciable softening of the materials which form the container or coating, including temperatures approaching the Tg of the materials. In one embodiment, the coated articles exhibit substantially no blushing or whitening when immersed in or otherwise exposed directly to water at a temperature of about 0° C. to 30° C., including about 5° C., 10° C., 15° C., 20° C., 22° C., and 25° C. for about 24 hours. The process used for curing or drying coating layers appears to have an effect on the blush resistance of articles.

B. Detailed Description of the Drawings

Referring to FIG. 1, a preferred uncoated preform 1 is depicted. The preform is preferably made of an FDA approved material such as virgin PET and can be of any of a wide variety of shapes and sizes. The preform shown in FIG. 1 is a 24 gram preform of the type which will form a 16 oz. carbonated beverage bottle, but as will be understood by those skilled in the art, other preform configurations can be used depending upon the desired configuration, characteristics and use of the final article. The uncoated preform 1 may be made by injection molding as is known in the art or by other suitable methods.

Figure 2:
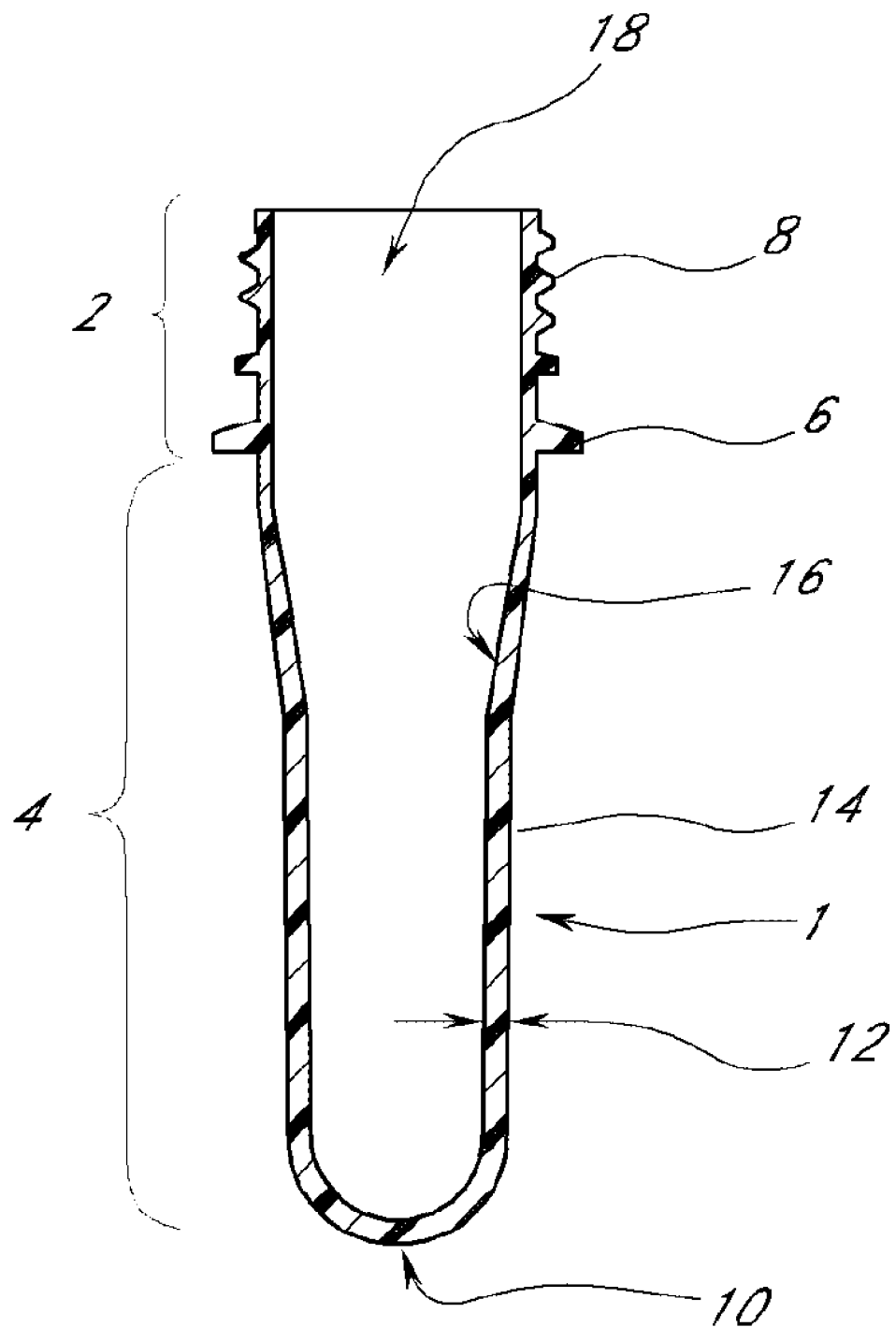
FIG. 2 is a cross-section of a preferred uncoated preform of the type that is coated in accordance with a preferred embodiment.

Referring to FIG. 2, a cross-section of a preferred uncoated preform 1 of FIG. 1 is depicted. The uncoated preform 1 has a neck portion 2 and a body portion 4. The neck portion 2, also called the neck finish, begins at the opening 18 to the interior of the preform 1 and extends to and includes the support ring 6. The neck 2 is further characterized by the presence of the threads 8, which provide a way to fasten a cap for the bottle produced from the preform 1. The body portion 4 is an elongated and cylindrically shaped structure extending down from the neck 2 and culminating in the rounded end cap 10. The preform thickness 12 will depend upon the overall length of the preform 1 and the wall thickness and overall size of the resulting container. It should be noted that as the terms "neck" and "body" are used herein, in a container that is colloquially called a "longneck" container, the elongate portion just below the support ring, threads, and/or lip where the cap is fastened would be considered part of the "body" of the container and not a part of the "neck".

Figure 3:
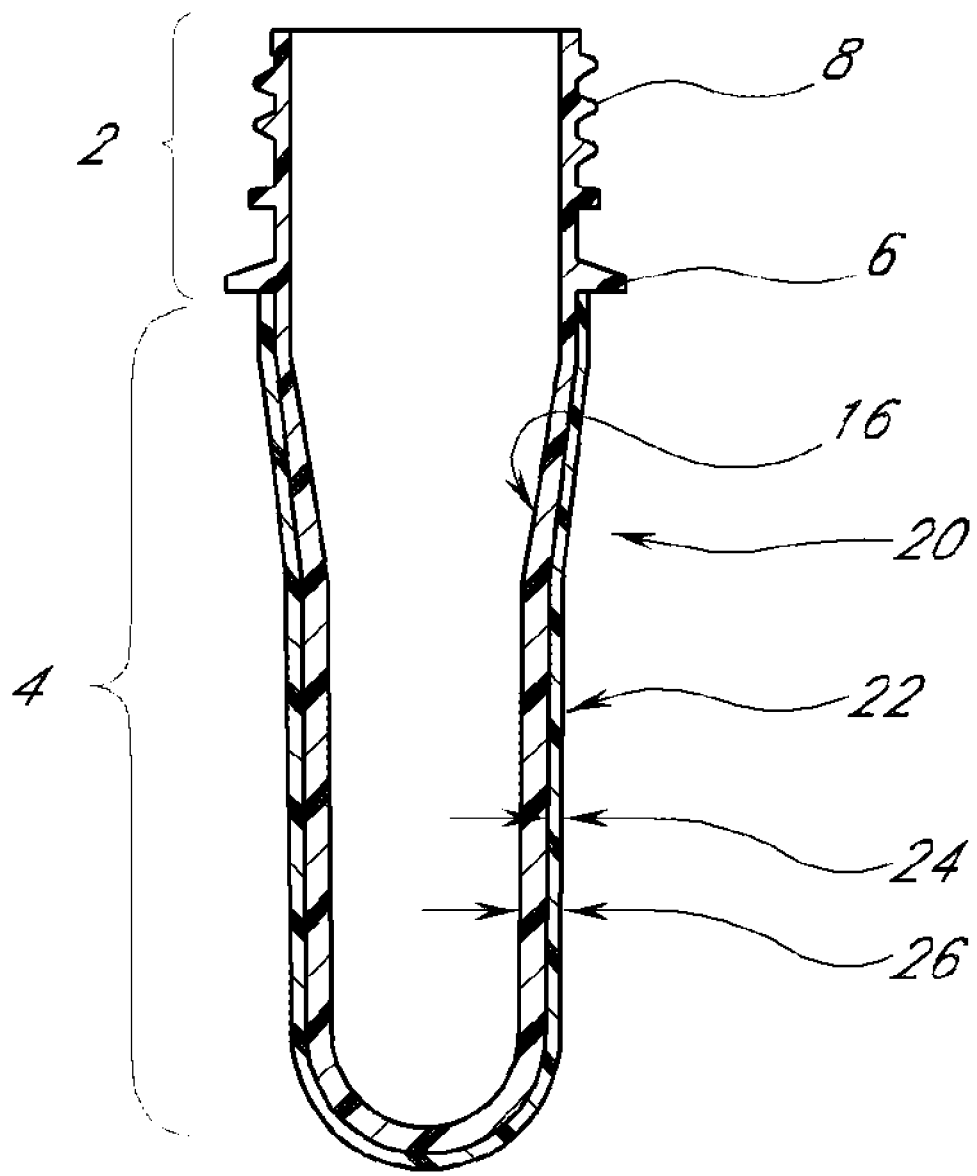
FIG. 3 is a cross-section of one preferred embodiment of a coated preform.

Referring to FIG. 3, a cross-section of one type of coated preform 20 having features in accordance with a preferred embodiment is depicted. The coated preform 20 has a neck portion 2 and a body portion 4 as in the uncoated preform 1 in FIGS. 1 and 2. The coating layer 22 is disposed about the entire surface of the body portion 4, terminating at the bottom of the support ring 6. A coating layer 22 in the embodiment shown in the figure does not extend to the neck portion 2, nor is it present on the interior surface 16 of the preform which is preferably made of an FDA approved material such as PET. The coating layer 22 may comprise one layer of a single material, one layer of several materials combined, or several layers of at least two materials. The overall thickness 26 of the preform is equal to the thickness of the initial preform plus the thickness 24 of the coating layer or layers, and is dependent upon the overall size and desired coating thickness of the resulting container.

Figure 4:
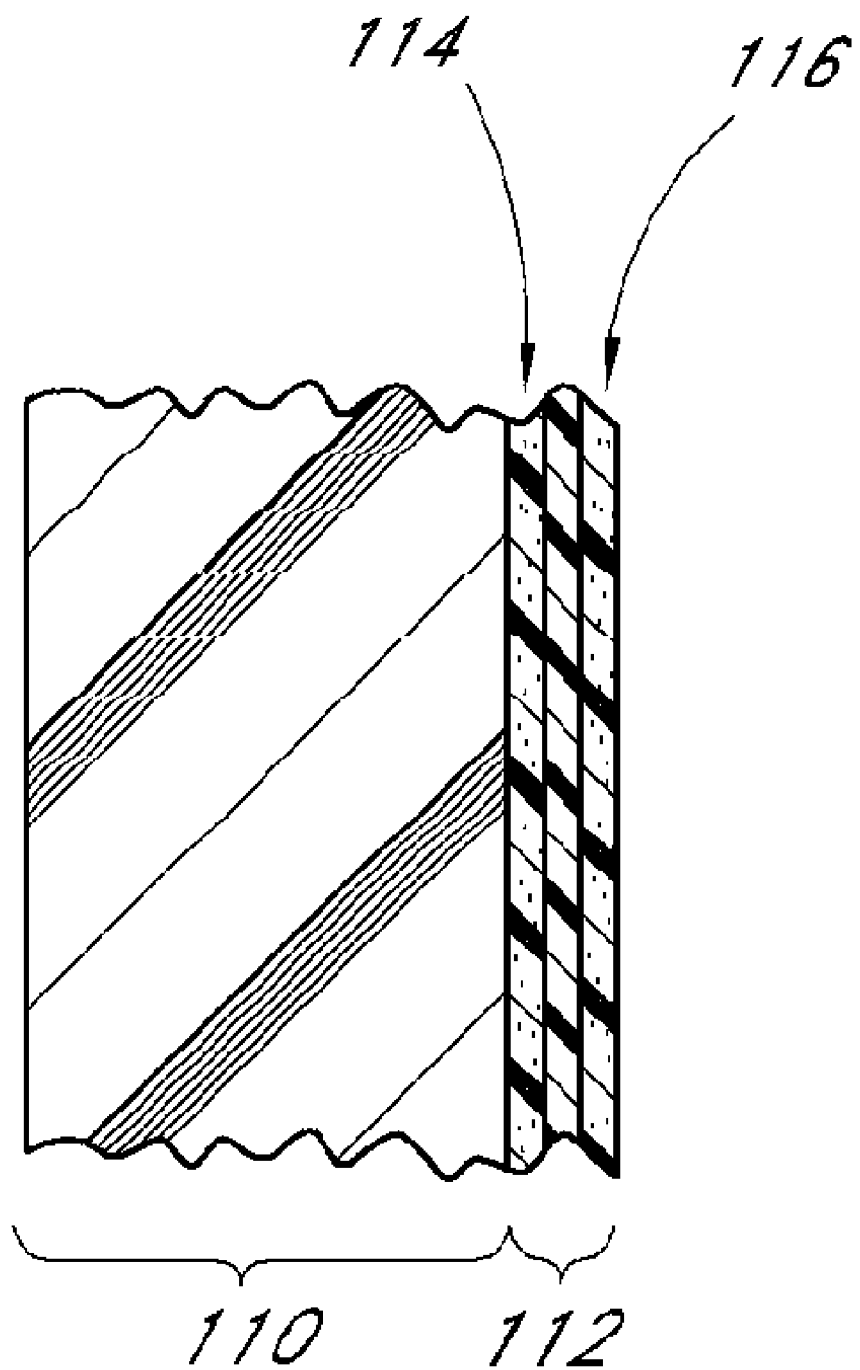
FIG. 4 is an enlargement of a section of the wall portion of a coated preform.

FIG. 4 is an enlargement of a wall section of the preform showing the makeup of the coating layers in one embodiment of a preform. The layer 10 is the substrate layer of the preform while 112 comprises the coating layers of the preform. The outer coating layer 116 comprises one or more layers of material, while 114 comprises the inner coating layer. In preferred embodiments there may be one or more outer coating layers. As shown here, the coated preform has one inner coating layer and two outer coating layers. Not all preforms of FIG. 4 will be of this type.

Figure 5:
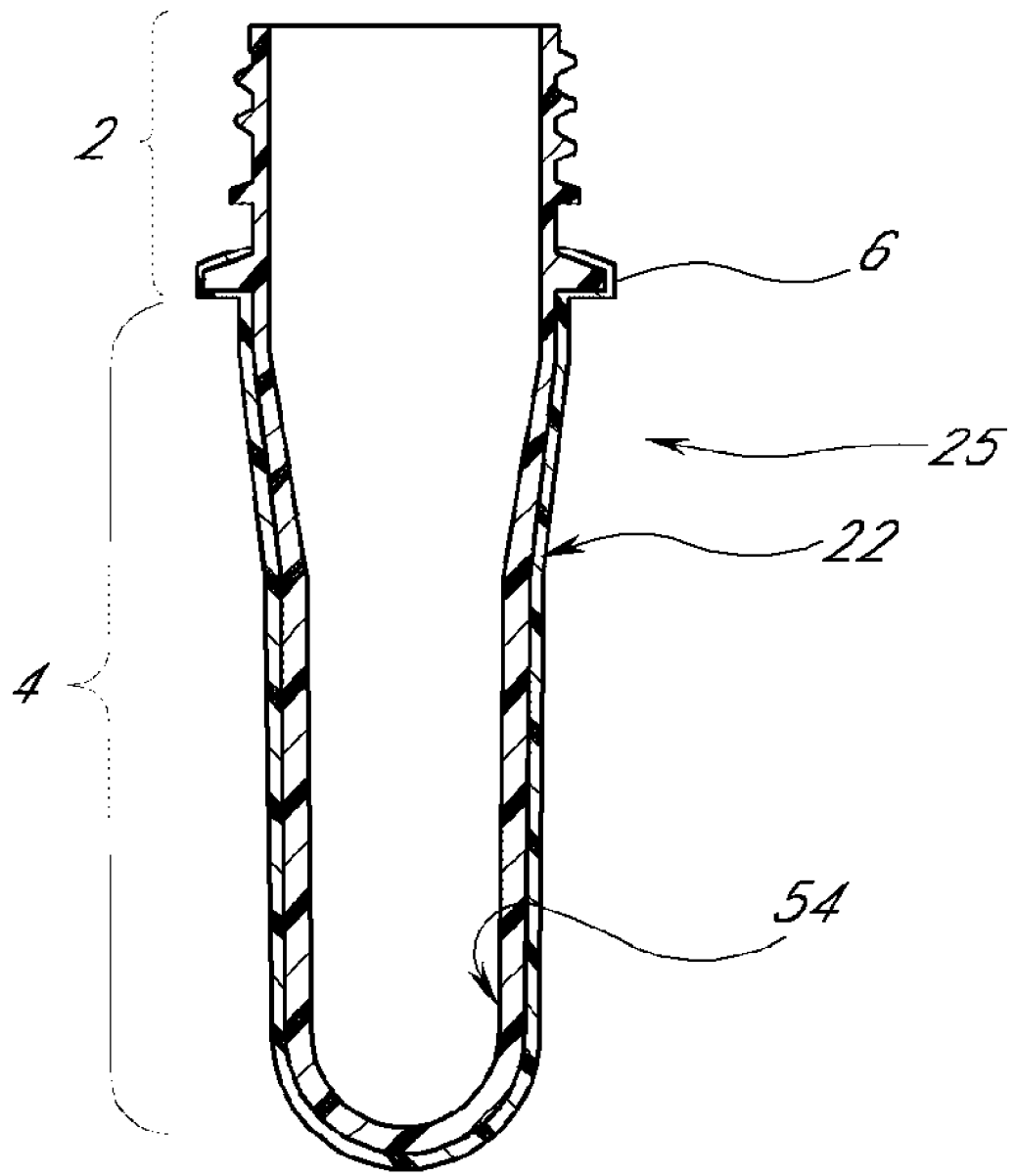
FIG. 5 is a cross-section of another embodiment of a coated preform.

Referring to FIG. 5, another embodiment of a coated preform 25 is shown in cross-section. The primary difference between the coated preform 25 and the coated preform 20 in FIG. 3 is that the coating layer 22 is disposed on the support ring 6 of the neck portion 2 as well as the body portion 4. Preferably any coating that is disposed on, especially on the upper surface, or above the support ring 6 is made of an FDA approved material such as PET.

The coated preforms and containers can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the coating layer in FIG. 3, the coating layer in the preform and container embodiments disclosed herein may comprise a single material, a layer of several materials combined, or several layers of at least two or more materials.

Figure 6:
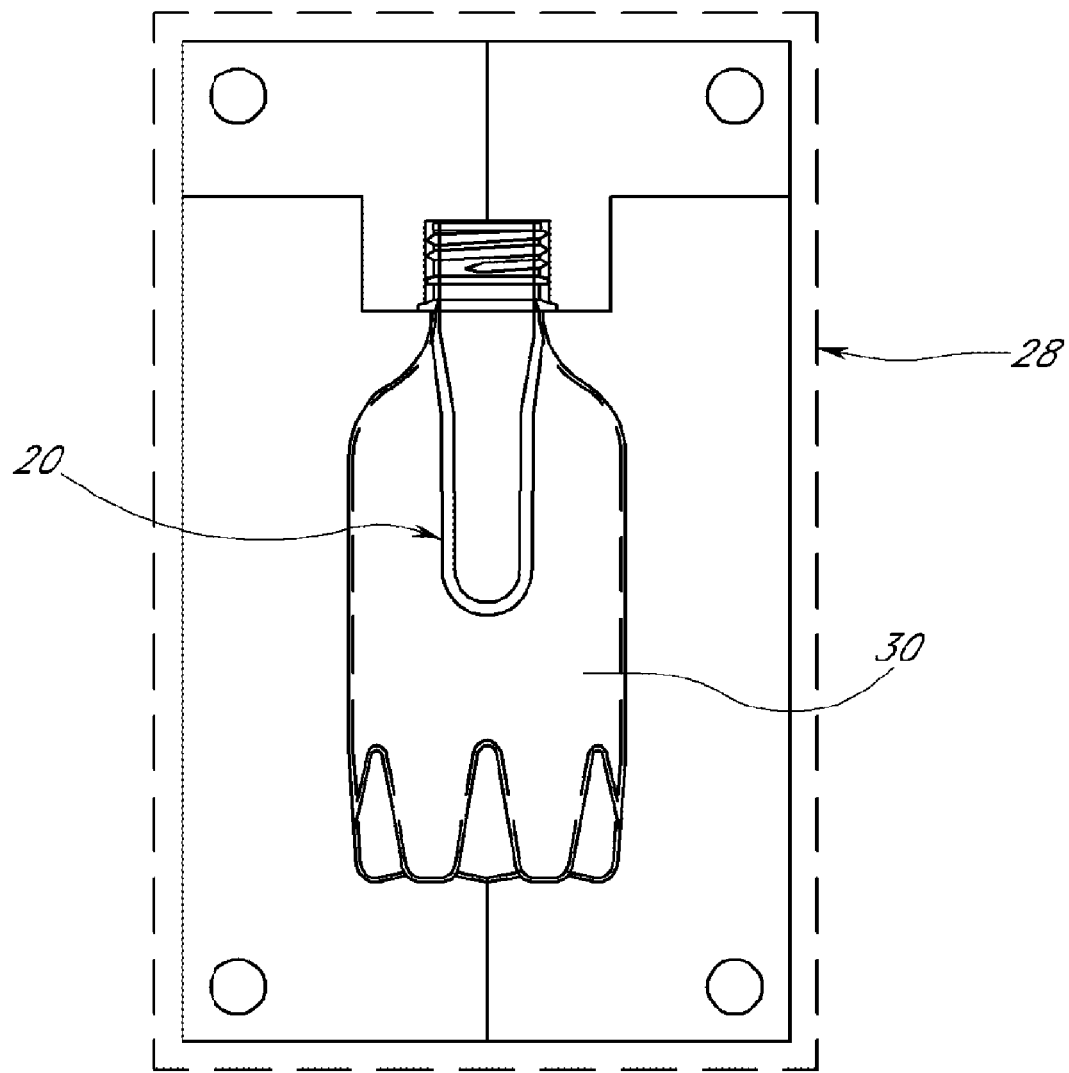
FIG. 6 is a cross-section of a preferred preform in the cavity of a blow-molding apparatus of a type that may be used to make a preferred coated container of an embodiment of the present invention.

After a coated preform, such as that depicted in FIG. 3, is prepared by a method and apparatus such as those discussed in detail below, it is subjected to a stretch blow-molding process. Referring to FIG. 6, in this process a coated preform 20 is placed in a mold 28 having a cavity corresponding to the desired container shape. The coated preform is then heated and expanded by stretching and by air forced into the interior of the preform 20 to fill the cavity within the mold 28, creating a coated container 30. The blow molding operation normally is restricted to the body portion 4 of the preform with the neck portion 2 including the threads, pilfer ring, and support ring retaining the original configuration as in the preform.

Figure 7:
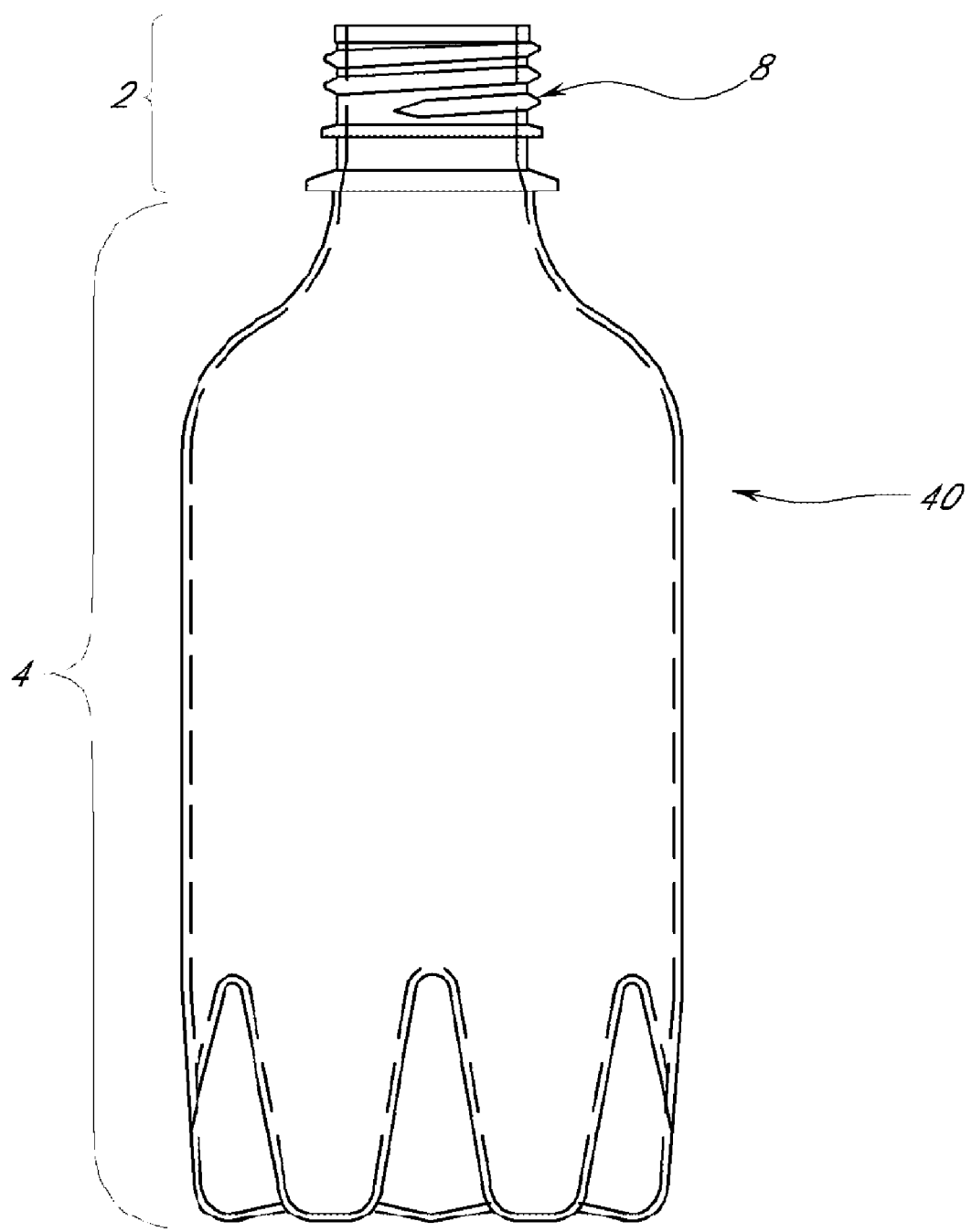
FIG. 7 is a coated container prepared in accordance with a blow molding process.

Referring to FIG. 7, there is disclosed an embodiment of coated container 40 in accordance with a preferred embodiment, such as that which might be made from blow molding the coated preform 20 of FIG. 3. The container 40 has a neck portion 2 and a body portion 4 corresponding to the neck and body portions of the coated preform 20 of FIG. 3. The neck portion 2 is further characterized by the presence of the threads 8 which provide a way to fasten a cap onto the container.

Figure 8:
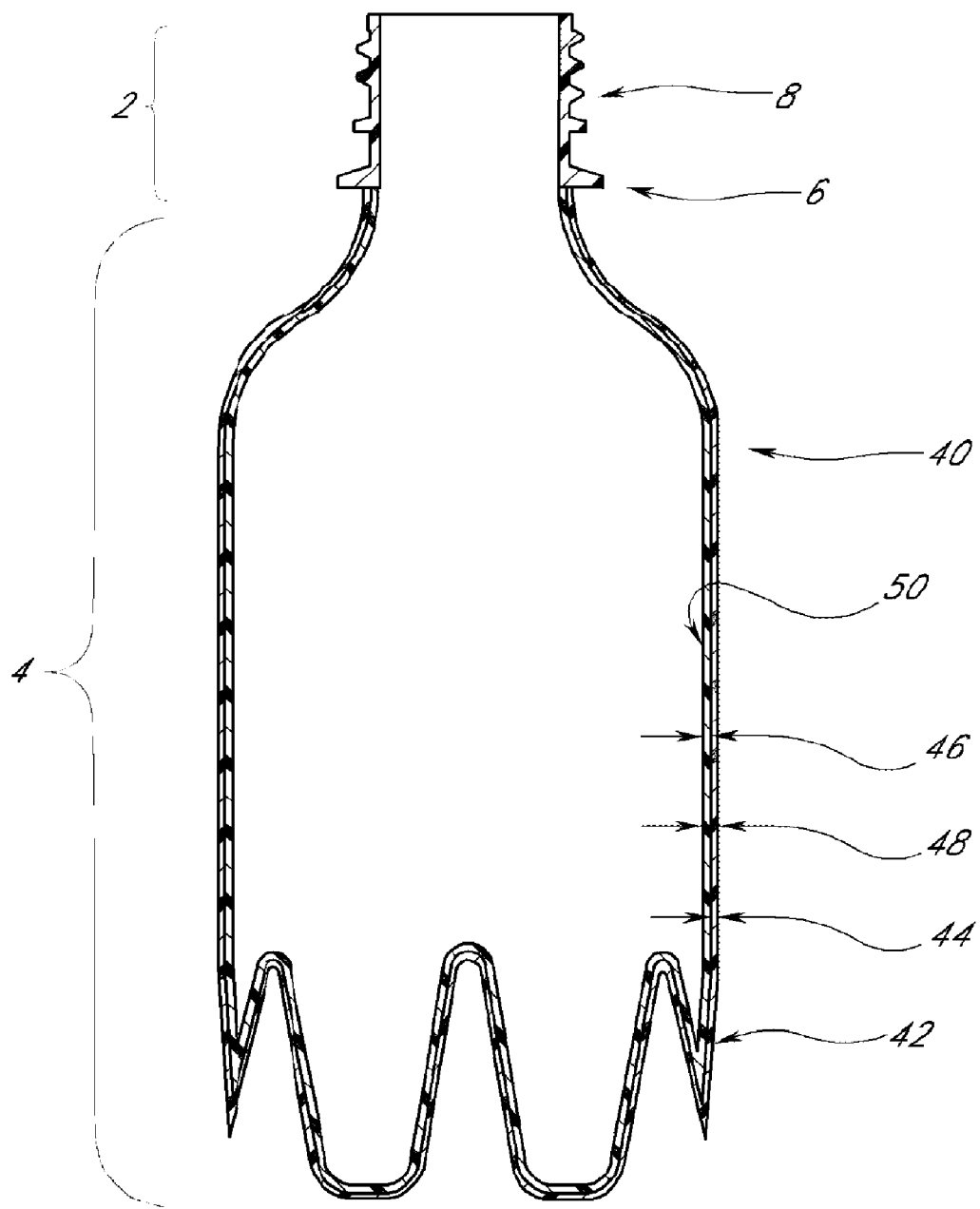
FIG. 8 is a cross-section of one preferred embodiment of a coated container having features in accordance with the present invention.

When the coated container 40 is viewed in cross-section, as in FIG. 8, the construction can be seen. The coating 42 covers the exterior of the entire body portion 4 of the container 40, stopping just below the support ring 6. The interior surface 50 of the container, which is made of an FDA-approved material, preferably PET, remains uncoated so that only the interior surface 50 is in contact with the packaged product such as beverages, foodstuffs, or medicines. In one preferred embodiment that is used as a carbonated beverage container, a 24 gram preform is blow molded into a 16 ounce bottle with a coating ranging from about 0.05 to about 0.75 grams, including about 0.1 to about 0.2 grams.

Figure 9:
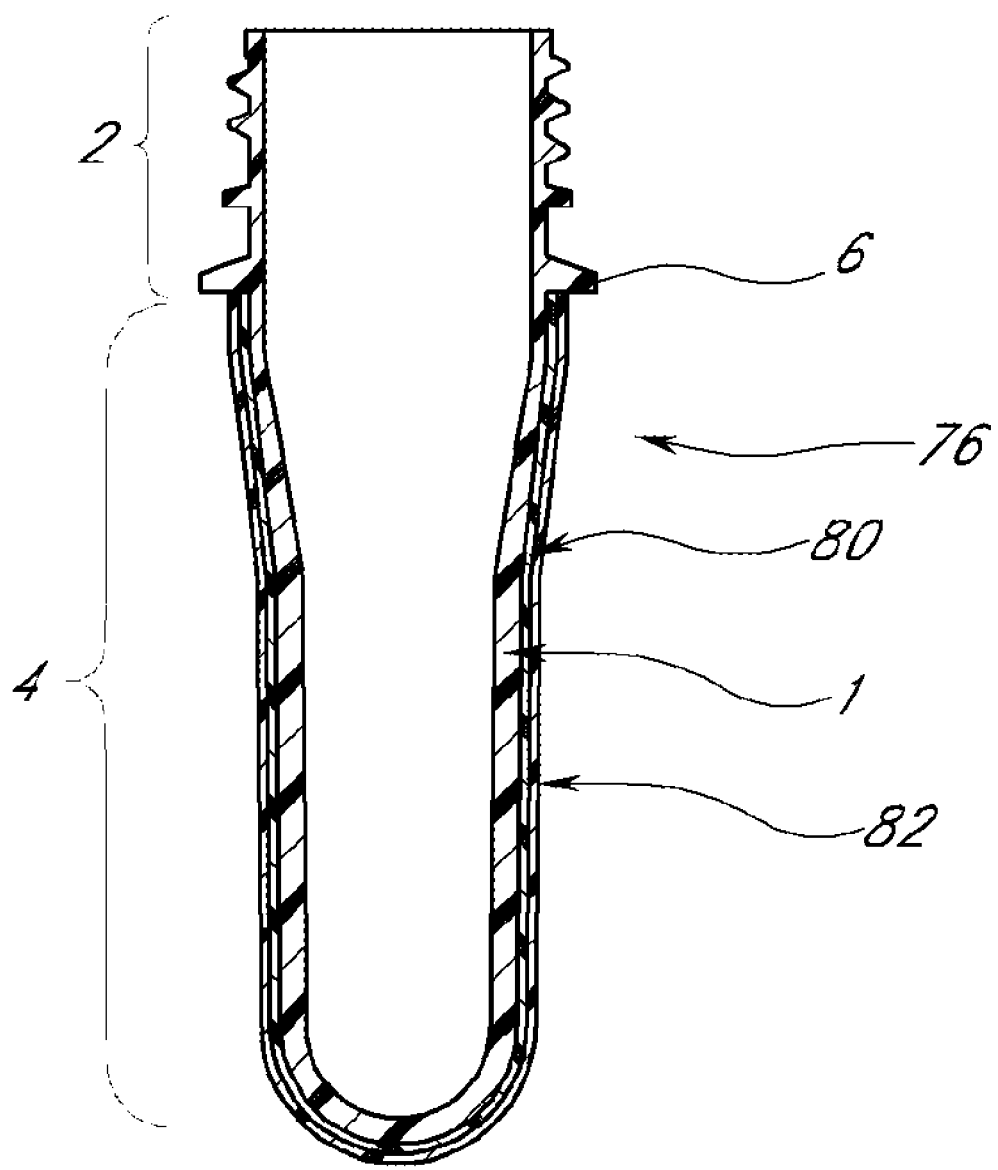
FIG. 9 is a three-layer embodiment of a preform.

Referring to FIG. 9 there is shown a preferred three-layer preform 76. This embodiment of coated preform is preferably made by placing two coating layers 80 and 82 on a preform 1 such as that shown in FIG. 1.

Figure 10:
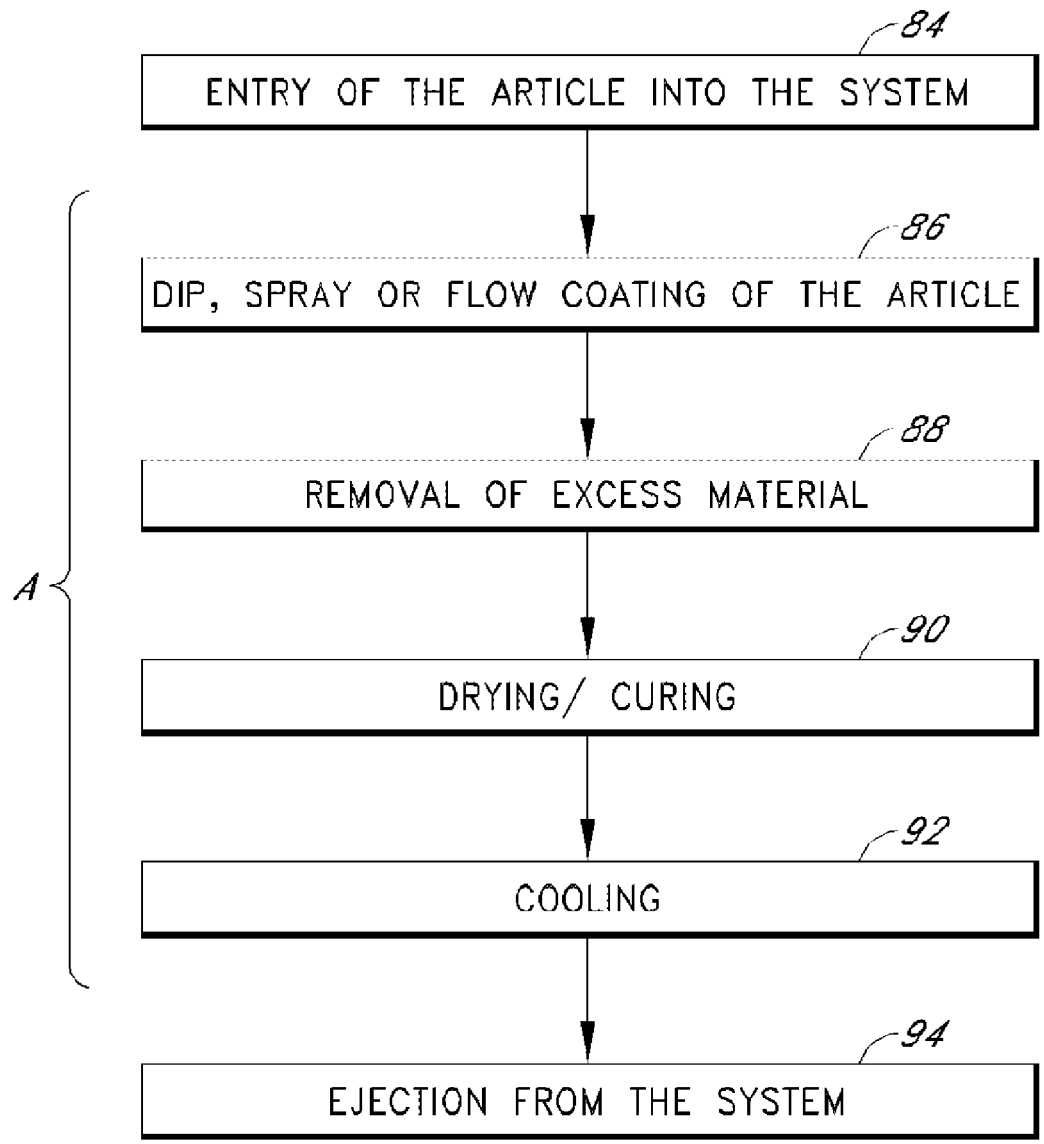
FIG. 10 there is a non-limiting flow diagram that illustrates a preferred process.

Referring to FIG. 10 there is shown a non-limiting flow diagram that illustrates a preferred process and apparatus. A preferred process and apparatus involves entry of the article into the system 84, dip, spray, or flow coating of the article 86, removal of excess material 88, drying/curing 90, cooling 92, and ejection from the system 94.

Figure 11:
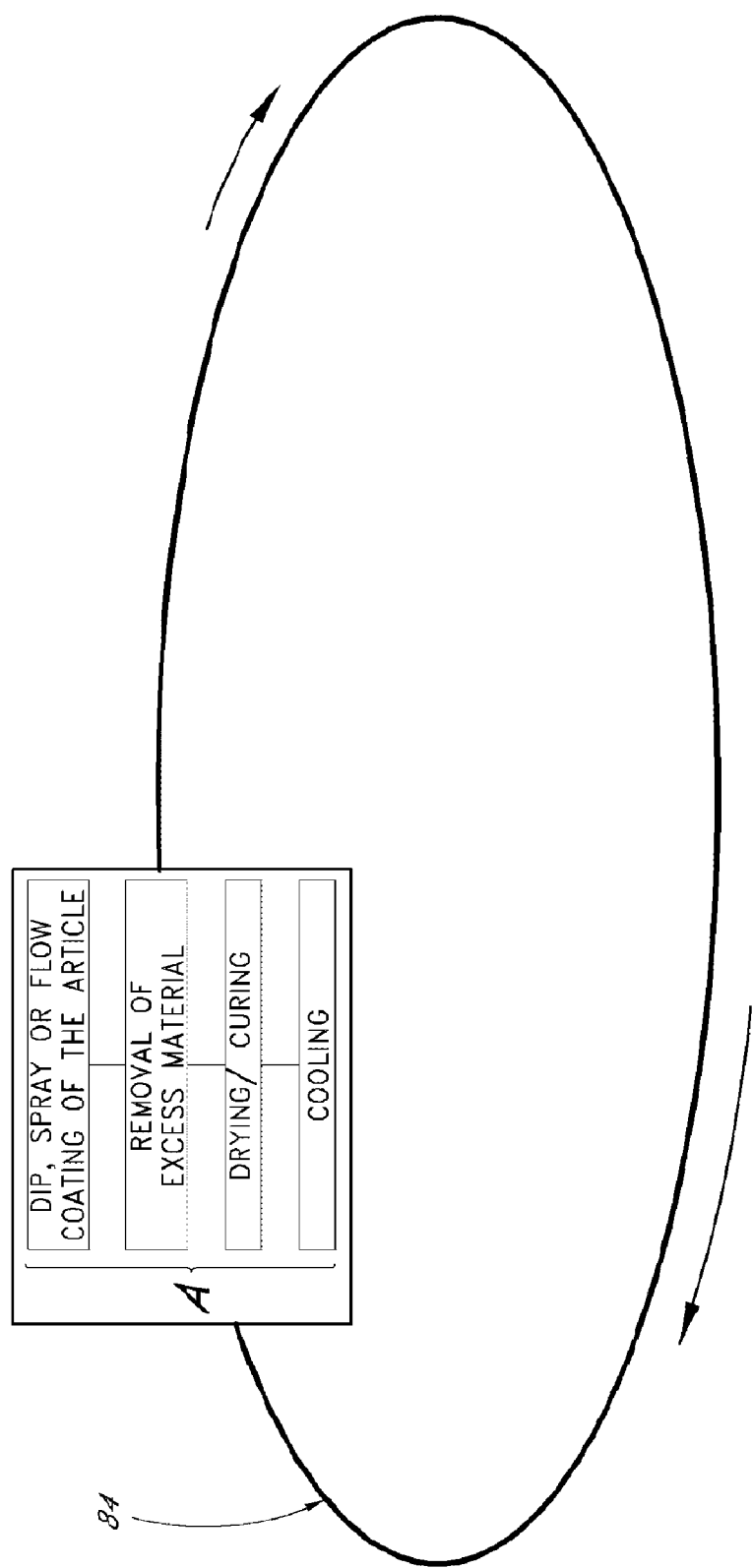
FIG. 11 is a non-limiting flow diagram of one embodiment of a preferred process wherein the system comprises a single coating unit.

Referring to FIG. 11 there is shown a non-limiting flow diagram of one embodiment of a preferred process wherein the system comprises a single coating unit, A, of the type in FIG. 10 which produces a single coat article. The article enters the system 84 prior to the coating unit and exits the system 94 after leaving the coating unit.

Figure 12:
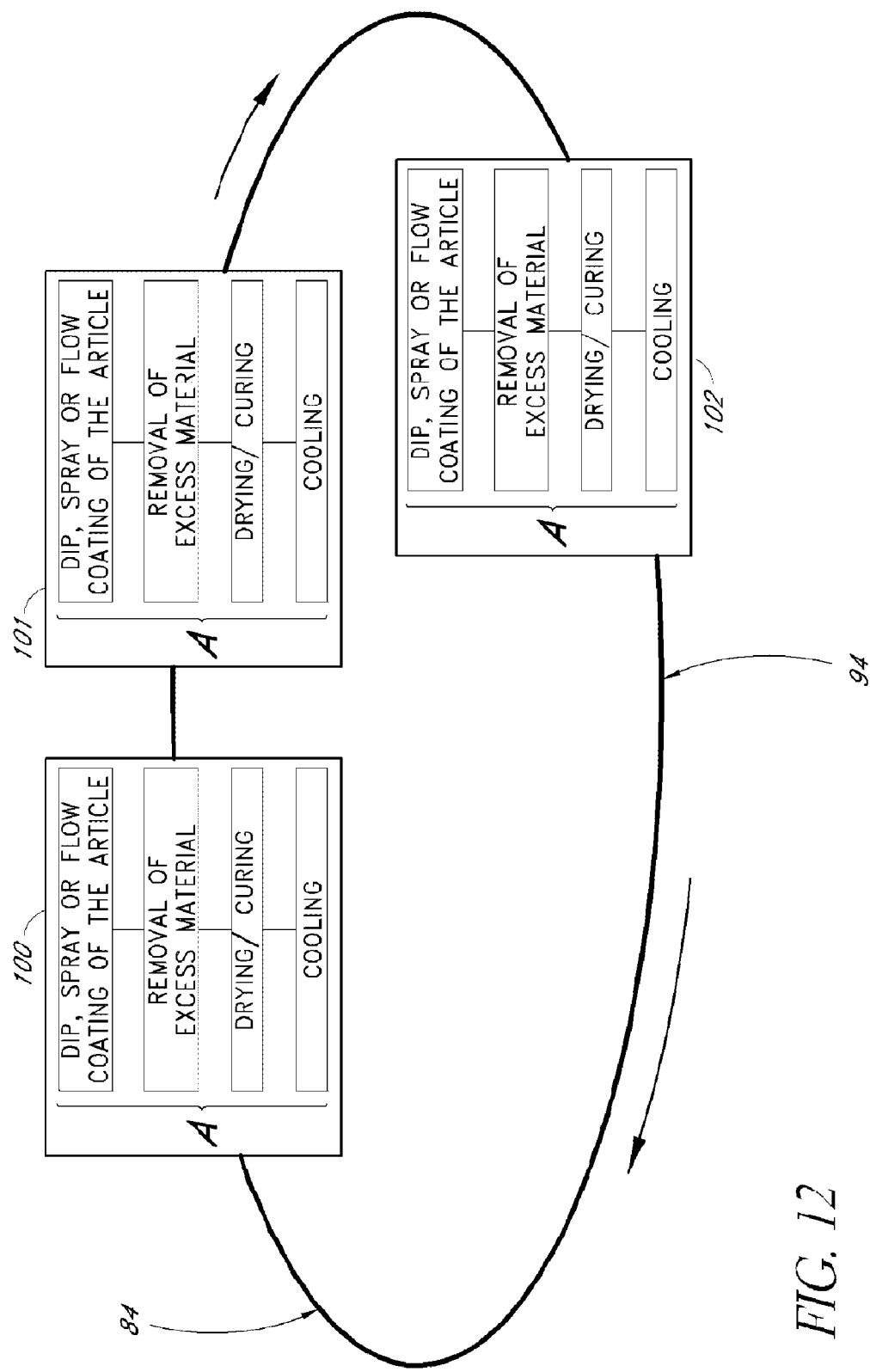
FIG. 12 is a non-limiting flow diagram of a preferred process wherein the system comprises multiple coating units in one integrated system.

Referring to FIG. 12 there is shown a non-limiting flow diagram of a preferred process wherein the system comprises a single integrated processing line that contains multiple stations 100, 101, 102 wherein each station coats and dries or cures the article thereby producing an article with multiple coatings. The article enters the system 84 prior to the first station 100 and exits the system 94 after the last station 102. The embodiment described herein illustrates a single integrated processing line with three coating units, it is to be understood that numbers of coating units above or below are also included.

Figure 13:
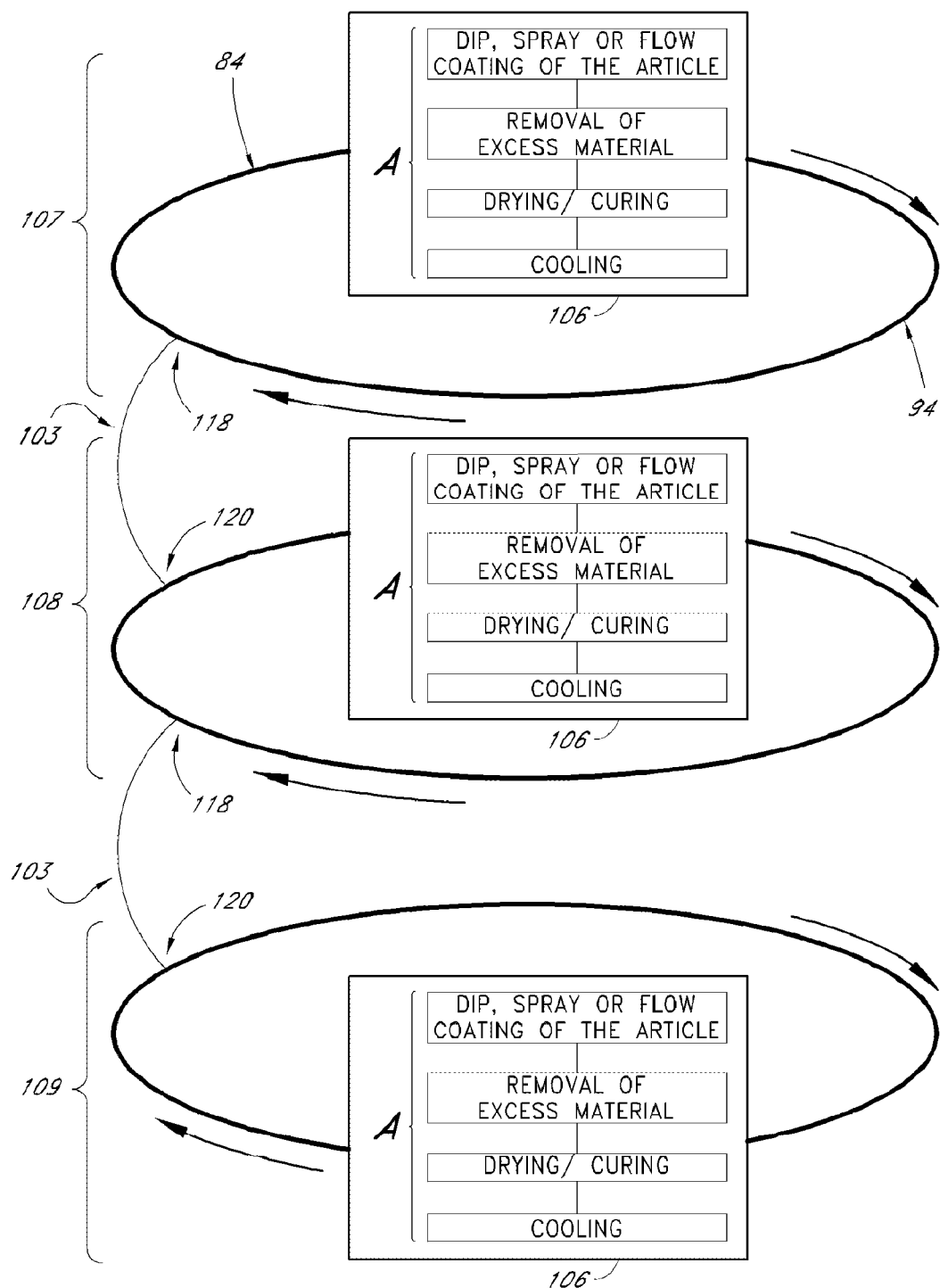
FIG. 13 is a non-limiting flow diagram of a preferred process wherein the system comprises multiple coating units in a modular system.

Referring to FIG. 13 there is shown a non-limiting flow diagram of one embodiment of a preferred process. In this embodiment, the system is modular wherein each processing line 107, 108, 109 is self-contained with the ability to handoff to another line 103, thereby allowing for single or multiple coatings depending on how many modules are connected thereby allowing maximum flexibility. The article first enters the system at one of several points in the system 84 or 120. The article can enter 84 and proceed through the first module 107, then the article may exit the system at 118 or continue to the next module 108 through a hand off mechanism 103 known to those of skill in the art. The article then enters the next module 108 at 120. The article may then continue on to the next module 109 or exit the system. The number of modules may be varied depending on the production circumstances required. Further the individual coating units 104 105 106 may comprise different coating materials depending on the requirements of a particular production line. The interchangeability of different modules and coating units provides maximum flexibility.

Referring to FIGS. 14, 15, and 16 there are shown alternate views of non-limiting diagrams of one embodiment of a preferred process. In this embodiment, the top view of a system comprising a single flow coater 86 is shown. The preform enters the system 84 and then proceeds to the flow coater 86 wherein the preform 1 passes through the coating material waterfall. The coating material proceeds from the tank or vat 150 through the gap 155 in the tank down the angled fluid guide 160 where it forms a waterfall (not illustrated) as it passes onto the preforms. The gap 155 in the tank may be widened or narrowed to adjust the flow of the material. The material is pumped from the reservoir (not illustrated) into the vat or tank at a rate that maintains the coating material level above that of the gap 155. Advantageously, this configuration ensures a constant flow of coating material. The excess amount of material also dampens any fluid fluctuations due to the cycling of the pump. As the preform passes out of the coating waterfall, excess material drips off into the material collection reservoir 170. The coating material collector (not illustrated) receives any unused coating waterfall and returns the material back to the coating tank or vat. The excess material is then removed from the bottom of the preform 88. The preform then moves toward the drying/curing unit 90 before being ejected from the system 94. As shown here, the preforms are allowed to rest before ejection to cool. The collection reservoir and coating material collector preferably empty into the reservoir that feeds the tank or vat so as to allow for reduction of waste from the system.

Referring to FIGS. 17A and 17B there are shown non-limiting views of one embodiment of a preferred IR drying/ curing unit 90. As shown in FIG. 17A the unit 90 is open. The arrow at the bottom of the unit indicates how the unit would close. On one side of the processing line there is shown a series of ten lamps 200. Below the preforms there is shown an angled reflector 210 which reflects heat towards the bottom of the preforms for more thorough curing. Opposite to the lamps is a semicircular reflector 230 which reflects the IR heat back onto the preforms allowing for a more thorough and efficient cure. Reflectors of other shapes and sizes may also be used.

Referring to FIG. 17B there is an enlarged section detailing the lamp placement in one embodiment of a preferred IR drying/curing unit 90. The lamps in this embodiment are adjustable 220 and may be moved closer to or farther away from the preform allowing for maximum drying/curing flexibility.

A preferred method and apparatus for making coated articles, more specifically preforms, is discussed in more detail below.

C. Physical Characteristics of Preferred Coating Materials

The following physical characteristics are described in terms of a preferred material, PET. However, those of skill in the art will understand that other suitable substrates, as mentioned previously, may be used.

The glass transition temperature (Tg) is a property relating to the transition of a polymer from a glassy form to a plastic form. In a range of temperatures above its Tg, a material will become soft enough to allow it to flow readily when subjected to an external force or pressure, yet not so soft that its viscosity is so low that it acts more like a liquid than a pliable solid. The temperature range above Tg is a preferred temperature range for performing a blow-molding process, as the material is soft enough to flow under the force of the air blown into the preform to fit the mold but not so soft that it breaks up or becomes uneven in texture. Thus, when materials have similar glass transition temperatures, they will have similar preferred blowing temperature ranges, allowing the materials to be processed together without compromising the performance of either material.

In the blow-molding process to produce a bottle from a preform, the preform is heated to a temperature slightly above the Tg of the preform material so that when air is forced into the preform's interior, it will be able to flow to fill the mold in which it is placed. If one does not sufficiently heat the preform the preform material will be too hard to flow properly, and would likely crack, craze, or not expand to fill the mold. Conversely, if one heats the preform to a temperature well above the Tg, the material would likely become so soft that it would not be able to hold its shape or it would crystallize and would process improperly.

If the material which forms a coating layer has a Tg similar to that of the chosen substrate material, it will have a blowing temperature range similar to the substrate. For example, if a PET preform is coated with such a material, a blowing temperature can be chosen that allows both materials to be processed within their preferred blowing temperature ranges. If the coating were to have a Tg dissimilar to that of PET, it would be difficult, if not impossible, to choose a blowing temperature suitable for both materials. When coating materials comprise polymers having a Tg similar to PET (or the chosen substrate material), the coated preform behaves during blow molding substantially as if it were made of one material, expanding smoothly and creating a cosmetically appealing container with an even thickness and uniform coating of the material where it is applied.

The glass transition temperature of PET occurs in a window of about 75-85° C., depending upon how the PET has been processed previously. Therefore, the Tg for preferred coating materials to coat PET preferably range from about 55 to about 140° C., more preferably from about 90 to about 110° C., including about 60, 65, 70, 80, 95, 100, 105, 115, 120, and 130. One should note that if the coating is applied to a container, such as a bottle, the Tg of the coating material is greatly diminished in importance because the need for blow molding is absent.

Another factor which has an impact on the performance of coated preforms during blow molding is the state of the material. It is preferred that coating materials be amorphous rather than crystalline. This is because materials in an amorphous state are easier to form into bottles and containers by use of a blow molding process than materials in a crystalline state. PET can exist in both crystalline and amorphous forms. However, in certain embodiments of the present invention, it is preferred that the crystallinity of the PET be minimized and the amorphous state maximized in order to create a semicrystalline state which, among other things, aids interlayer adhesion and in the blow molding process. In other embodiments, such as when the article coated is a container such that there is no subsequent blow molding or when crystallinity is desired, such as for hot-fill containers, having amorphous substrates and/or coatings is not important, and may even be contraindicated.

Preferred coating materials may have tensile strength and creep resistance similar to PET or the chosen substrate material. If so, they may act as a structural component of the container, allowing the coating material to displace some of the polyethylene terephthalate in the preform without sacrificing preform performance. Similarity in tensile strength between PET and the coating materials helps the container to have structural integrity while similarity in creep resistance between PET and the coating materials helps the container to retain its shape. Creep resistance relates to the ability of a material to resist changing its shape in response to an applied force. Although certain preferred embodiments may have coatings that provide structural integrity, other preferred embodiments may not.

For applications where optical clarity is of importance, preferred coating materials have an index of refraction similar to that of PET or the chosen substrate material. When the refractive index of the PET and the coating material are similar, the preforms and, perhaps more importantly, the containers blown therefrom are optically clear and, thus, cosmetically appealing for use as a beverage container where clarity of the bottle is frequently desired. If, however, the two materials have substantially dissimilar refractive indices when they are placed in contact with each other, the resulting combination may have visual distortions and may be cloudy or opaque, depending upon the degree of difference in the refractive indices of the materials.

Polyethylene terephthalate has an index of refraction for visible light within the range of about 1.40 to 1.75, depending upon its physical configuration. When made into preforms, the refractive index is preferably within the range of about 1.55 to 1.75, and more preferably in the range of 1.55-1.65. After the preform is made into a bottle, the wall of the final product, may be characterized as a biaxially-oriented film since it is subject to both hoop and axial stresses in the blow molding operation. Blow molded PET generally exhibits a refractive index within the range of about 1.40 to 1.75, usually about 1.55 to 1.75, depending upon the stretch ratio involved in the blow molding operation. For relatively low stretch ratios of about 6:1, the refractive index will be near the lower end, whereas for high stretch ratios, about 10:1, the refractive index will be near the upper end of the aforementioned range. It will be recognized that the stretch ratios referred to herein are biaxial stretch ratios resulting from and include the product of the hoop stretch ratio and the axial stretch ratio. For example, in a blow molding operation in which the final preform is enlarged by a factor of 2.5 in the axial direction and a factor of 3.5 diametrically, the stretch ratio will be about 8.75 (2.5×3.5).

Using the designation $n_i$ to indicate the refractive index for PET and $n_o$ to indicate the refractive index for the coating material, the ratio between the values $n_i$ and $n_o$ is preferably 0.8-1.3, more preferably 1.0-1.2, most preferably 1.0-1.1. As will be recognized by those skilled in the art, for the ratio $n_i/n_o=1$ the distortion due to refractive index will be at a minimum, because the two indices are identical. As the ratio progressively varies from one, however, the distortion increases progressively.

D. Preferred Coating Materials

In a preferred embodiment, the coating materials comprise thermoplastic epoxy resins (TPEs). A further preferred embodiment includes "phenoxy" resins which are a subset of thermoplastic epoxy resins. Phenoxy resins, as that term is used herein, include a wide variety of materials including those discussed in WO 99/20462. A further subset of phenoxy resins, and thermoplastic epoxy resins, are preferred hydroxy-phenoxyether polymers, of which polyhydroxyaminoether copolymers (PHAE) is a further preferred material. See for example, U.S. Pat. Nos. 6,455,116; 6,180,715; 6,011,111; 5,834,078; 5,814,373; 5,464,924; and 5,275,853; see also PCT Application Nos. WO 99/48962; WO 99/12995; WO 98/29491; and WO 98/14498.

Preferably, the thermoplastic epoxy resins, more specifically the phenoxy resins, used as coating materials in the present invention comprise one of the following types:

(1) hydroxy-functional poly(amide ethers) having repeating units represented by any one of the Formulae Ia, Ib or Ic:

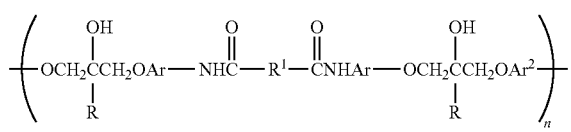

Ia

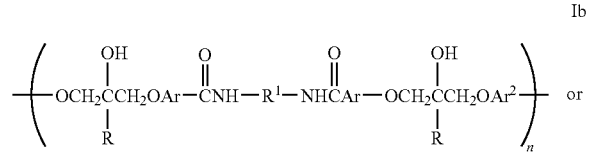

Ib

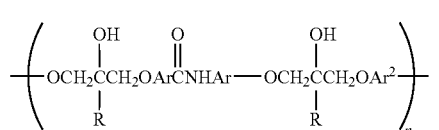

Ic (2) poly(hydroxy amide ethers) having repeating units represented independently by any one of the Formulae IIa, IIb or IIc:

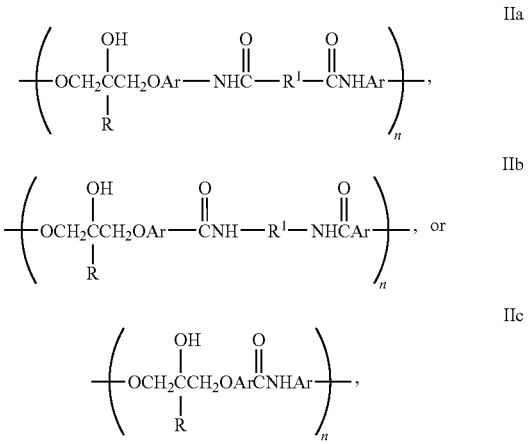

IIa

IIb

IIc (3) amide- and hydroxymethyl-functionalized polyethers having repeating units represented by Formula III:

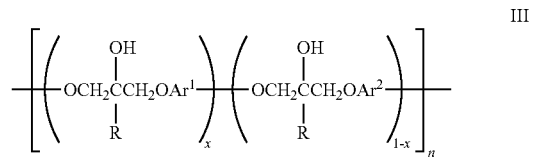

III (4) hydroxy-functional polyethers having repeating units represented by Formula IV:

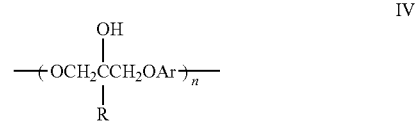

IV (5) hydroxy-functional poly(ether sulfonamides) having repeating units represented by Formulae Va or Vb:

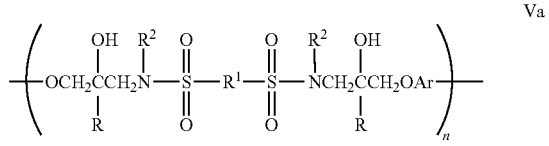

Va

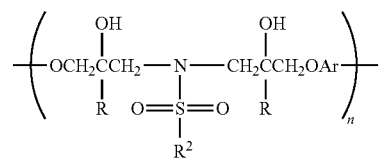

Vb (6) poly(hydroxy ester ethers) having repeating units represented by Formula VI:

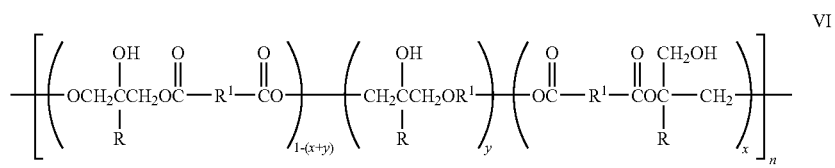

(7) hydroxy-phenoxyether polymers having repeating units represented by Formula VII:

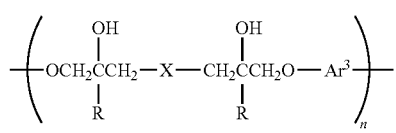

and (8) poly(hydroxyamino ethers) having repeating units represented by Formula VIII:

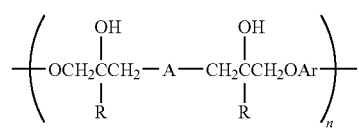

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

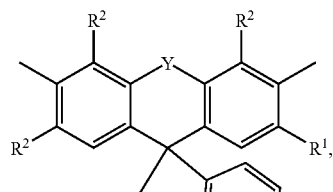

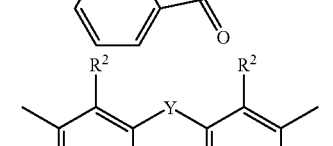

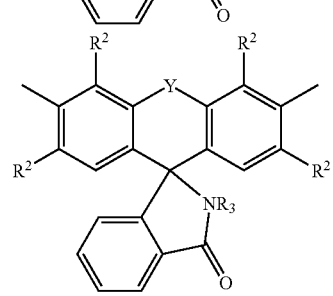

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido)alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853. For example, polyhydroxyaminoether copolymers can be made from resorcinol diglycidyl ether, hydroquinone diglycidyl ether, bisphenol A diglycidyl ether, or mixtures thereof.

The phenoxy thermoplastics commercially available from Phenoxy Associates, Inc., PAPHEN 25068-38-6 as one example, are suitable for use in the present invention. These hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety.

Generally, preferred TPE, including phenoxy and PHAE, coating materials form stable aqueous based solutions or dispersions. Preferably, the coating properties of the solutions/dispersions are not adversely affected by contact with water. Preferred coating materials range from about 10% solids to about 50% solids, including about 15%, 20%, 25%, 30%, 35%, 40% and 45%, and ranges encompassing such percentages. Preferably, the coating material used dissolves or disperses in polar solvents. These polar solvents include, but are not limited to, water, alcohols, and glycol ethers. See, for example, U.S. Pat. Nos. 6,455,116, 6,180,715, and 5,834,078 which describe some preferred TPE solutions and/or dispersions.

One preferred thermoplastic epoxy coating material is a polyhydroxyaminoether copolymer (PHAE), represented by Formula VIII, dispersion or solution. The dispersion or solution, when applied to a container or preform, greatly reduces the permeation rate of a variety of gases through the container walls in a predictable and well known manner. One dispersion or latex made thereof comprises 10-30 percent solids. A PHAE solution/dispersion may be prepared by stirring or otherwise agitating the PHAE in a solution of water with an organic acid, preferably acetic or phosphoric acid, but also including lactic, malic, citric, or glycolic acid and/or mixtures thereof These PHAE solution/dispersions also include organic acid salts produced by the reaction of the polyhydroxyaminoethers with these acids.

The following PHAE solutions are examples of suitable TPE solutions. One suitable material is BLOX® experimental barrier resin, for example XU-19061.00 made with phosphoric acid manufactured by Dow Chemical Corporation. This particular PHAE dispersion is said to have the following typical characteristics: 30% percent solids, a specific gravity of 1.30, a pH of 4, a viscosity of 24 centipoise (Brookfield, 60 rpm, LVI, 22° C.), and a particle size of between 1,400 and 1,800 angstroms. Other suitable materials include BLOX® 599-29 resins based on resorcinol have also provided superior results as a barrier material. This particular dispersion is said to have the following typical characteristics: 30% percent solids, a specific gravity of 1.2, a pH of 4.0, a viscosity of 20 centipoise (Brookfield, 60 rpm, LVI, 22° C.), and a particle size of between 1500 and 2000 angstroms. Other variations of the polyhydroxyaminoether chemistry may prove useful such as crystalline versions based on hydroquinone diglycidylethers. Other suitable materials include polyhydroxyaminoether solutions by Imperial Chemical Industries ("ICI," Ohio, USA) more specifically coded EXP12468 and EXP12468-4B including cross-linked materials which exhibit high chemical resistance, low blushing and low surface tension. Other suitable solutions include one based upon BLOX® 5000 resin that is a proprietary material available from ICI, which comprises ICI-coded components PXR-15700, E6039, and F3473, which exhibits good cross-linking, chemical resistance and does not exhibit excessive foaming. Other suitable materials include BLOX® 5000 resin dispersion intermediate, BLOX® XUR 588-29, BLOX® 0000 and 4000 series resins. The solvents used to dissolve these materials include, but are not limited to, polar solvents such as alcohols, water, glycol ethers or blends thereof In one embodiment, preferred thermoplastic epoxies are soluble in aqueous acid. A polymer solution/dispersion may be prepared by stirring or otherwise agitating the thermoplastic epoxy in a solution of water with an organic acid, preferably acetic or phosphoric acid, but also including lactic, malic, citric, or glycolic acid and/or mixtures thereof In a preferred embodiment, the acid concentration in the polymer solution is preferably in the range of about 5%-20%, including about 5%-10% by weight based on total weight. In other preferred embodiments, the acid concentration may be below about 5% or above about 20%; and may vary depending on factors such as the type of polymer and its molecular weight. The amount of dissolved polymer in a preferred embodiment ranges from about 0.1% to about 40%. A uniform and free flowing polymer solution is preferred. In one embodiment a 10% polymer solution is prepared by dissolving the polymer in a 10% acetic acid solution at 90° C. Then while still hot the solution is diluted with 20% distilled water to give an 8% polymer solution. At higher concentrations of polymer, the polymer solution tends to be more viscous.

Examples of preferred copolyester coating materials and a process for their preparation is described in U.S. Pat. No. 4,578,295 to Jabarin. They are generally prepared by heating a mixture of at least one reactant selected from isophthalic acid, terephthalic acid and their $C_1$ to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone. Especially preferred copolyester coating materials are available from Mitsui Petrochemical Ind. Ltd. (Japan) as B-010, B-030 and others of this family.

Examples of preferred polyamide coating materials include MXD-6 from Mitsubishi Gas Chemical (Japan). Other preferred polyamide coating materials are blends of polyamide and polyester, including those comprising about 1-10% polyester by weight, where the polyester is preferably PET or a modified PET. The blends may be ordinary blends or they may be compatibilized with an antioxidant or other material. Examples of such materials include those described in U.S. patent application Ser. No. 10/395,899, filed Mar. 21, 2003, which is hereby incorporated by reference in its entirety. Polyamide materials may also be used as substrate materials.

Other preferred coating materials include polyethylene naphthalate (PEN), PEN copolyester, and PET/PEN blends. PEN materials can be purchased from Shell Chemical Company.

E. Additives to Enhance Coating Materials

An advantage of preferred methods disclosed herein are their flexibility allowing for the use of multiple functional additives. Additives known by those of ordinary skill in the art for their ability to provide enhanced $CO_2$ barriers, $O_2$ barriers, UV protection, scuff resistance, blush resistance, impact resistance and/or chemical resistance may be used.

Preferred additives may be prepared by methods known to those of skill in the art. For example, the additives may be mixed directly with a particular coating solution/dispersion, they may be dissolved/dispersed separately and then added to a particular coating solution/dispersion, or they may be combined with a particular coating prior to addition of the solvent that forms the solution/dispersion. In addition, in some embodiments, preferred additives may be used alone as a single coating layer.

In preferred embodiments, the barrier properties of a coating layer may be enhanced by the addition of different additives. Additives are preferably present in an amount up to about 40% of the coating solution/dispersion, also including up to about 30%, 20%, 10%, 5% and 1% of the coating solution/dispersion. Further, additives are preferably stable in aqueous conditions. For example, derivatives of resorcinal (m-dihydroxybenzene) may be used in conjunction with coating materials. The higher the resorcinol content the greater the barrier properties of the coating. Another additive that may be used are nanoparticles or nanoparticular materials. These nanoparticles are tiny particles of materials which enhance the barrier properties of a material by creating a more tortuous path for migrating oxygen or carbon dioxide. One preferred type of nanoparticular material is a microparticular clay-based product available from Southern Clay Products.

In preferred embodiments, the UV protection properties of the coating may be enhanced by the addition of different additives. In a preferred embodiment, the UV protection coating material used provides UV protection up to about 350 nm or greater, preferably about 370 nm or greater, more preferably about 400 nm or greater. The UV protection material may be used as an additive with layers providing additional functionality or applied separately as a single coat. Preferably additives providing enhanced UV protection are present in the coating solution/dispersion from about 1 to 20%, but also including about 3%, 5%, 10%, and 15%. Preferably the UV protection material is added in a form that is compatible with aqueous based solutions/dispersions. For example, a preferred UV protection material is Milliken UV390A clear shield. UV390A is an oily liquid for which mixing is aided by first blending the liquid with water, preferably in roughly equal parts by volume. This blend is then added to the TPE solution, for example, BLOX® 599-29, and agitated. The resulting solution contains about 10% UV390A and provides UV protection up to 400 nm when applied to a PET preform. As previously described, in another embodiment the UV390A solution is applied as a single coating.

In preferred embodiments, $CO_2$ scavenging properties can be added to the coating. In one preferred embodiment such properties are achieved by including an active amine which will react with $CO_2$ forming a high gas barrier salt. This salt will then act as a passive $CO_2$ barrier. The active amine may be an additive or it may be one or more moieties in the thermoplastic resin material of one or more layers.

In preferred embodiments, $O_2$ scavenging properties can be added to the coating by including $O_2$ scavengers such as anthroquinone and others known in the art. In other embodiments, these $O_2$ scavengers may also be used alone as a separate coating. These $O_2$ scavenging materials must first be activated by UV which can be done prior to the drying/curing process.

In another preferred embodiment, a top coat is applied to provide chemical resistance to harsher chemicals. Preferably these top coats are aqueous based polyesters or acrylics which are optionally partially or fully cross linked. A preferred aqueous based polyester is polyethylene terephthalate, however other polyesters may also be used. A preferred aqueous based acrylic is ICI PXR 14100 Carboxyl Latex.

A preferred aqueous based polyester resin is described in U.S. Pat. No. 4,977,191 (Salsman), incorporated herein by reference. More specifically, U.S. Pat. No. 4,977,191 describes an aqueous based polyester resin, comprising a reaction product of 20-50% by weight of waste terephthalate polymer, 10-40% by weight of at least one glycol an 5-25% by weight of at least one oxyalkylated polyol.

Another preferred aqueous based polymer is a sulfonated aqueous based polyester resin composition as described in U.S. Pat. No. 5,281,630 (Salsman), herein incorporated by reference. Specifically, U.S. Pat. No. 5,281,630 describes an aqueous suspension of a sulfonated water-soluble or water dispersible polyester resin comprising a reaction product of 20-50% by weight terephthalate polymer, 10-40% by weight at least one glycol and 5-25% by weight of at least one oxyalkylated polyol to produce a prepolymer resin having hydroxyalkyl functionality where the prepolymer resin is further reacted with about 0.10 mole to about 0.50 mole of alpha, beta-ethylenically unsaturated dicarboxylic acid per 100 g of prepolymer resin and a thus produced resin, terminated by a residue of an alpha, beta-ethylenically unsaturated dicarboxylic acid, is reacted with about 0.5 mole to about 1.5 mole of a sulfite per mole of alpha, beta-ethylenically unsaturated dicarboxylic acid residue to produce a sulfonated-terminated resin.

Yet another preferred aqueous based polymer is the coating described in U.S. Pat. No. 5,726,277 (Salsman), incorporated herein by reference. Specifically, U.S. Pat. No. 5,726,277 describes coating compositions comprising a reaction product of at least 50% by weight of waste terephthalate polymer and a mixture of glycols including an oxyalkylated polyol in the presence of a glycolysis catalyst wherein the reaction product is further reacted with a difunctional, organic acid and wherein the weight ratio of acid to glycols in is the range of 6:1 to 1:2.

While the above examples are provided as preferred aqueous based polymer coating compositions, other aqueous based polymers are suitable for use in the products and methods describe herein. By way of example only, and not meant to be limiting, further suitable aqueous based compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70-95° C., said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkanolamine of glycerin, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

Likewise, by example, U.S. Pat. No. 4,528,321 (Allen) discloses a dispersion in a water immiscible liquid of water soluble or water swellable polymer particles and which has been made by reverse phase polymerization in the water immiscible liquid and which includes a non-ionic compound selected from $C_{4-12}$ alkylene glycol monoethers, their $C_{1-4}$ alkanoates, $C_{6-12}$ polyakylene glycol monoethers and their $C_{1-4}$ alkanoates.

The coating materials may be cross-linked to enhance thermal stability of coatings for hot fill applications. Inner layers may comprise low-cross linking materials while outer layers may comprise high crosslinking materials or other suitable combinations. For example, the inner coating on the PET surface may utilize non or low cross-linked material, such as the BLOX® 599-29, and the outer coat may utilize material, such as EXP 12468-4B, capable of cross linking to ensure maximum adhesion to the PET. Suitable additives capable of cross linking may be added to the coating layer. Suitable cross linkers can be chosen depending upon the chemistry and functionality of the resin to which they are added. For example, amine cross linkers may be useful for crosslinking resins comprising epoxide groups. Preferably cross linking additives, if present, are present in an amount of about 1% to 10% of the coating solution/dispersion, preferably about 1% to 5%, also including 2%, 3%, 4%, 6%, 7%, 8%, and 9%.

In some embodiments, the coating material solutions or dispersions form foam and/or bubbles which can interfere with the coating process. One way to avoid this interference, is to add anti-foam/bubble agents to the coating solution/dispersion. Suitable anti-foam agents include, but are not limited to, nonionic surfactants, alkylene oxide based materials, siloxane based materials, and ionic surfactants. Preferably anti-foam agents, if present, are present in an amount of about 0.01% to about 0.3% of the coating solution/dispersion, preferably about 0.01% to about 0.2%, but also including about 0.02%, 0.03%, 0.04%, 0.05%, 0.06%, 0.07%, 0.08%, 0.09%, 0.1%, 0.25%, and ranges encompassing these amounts.

An advantage of the present invention is the ability to handle many types of additives and coatings in an aqueous based system. This makes the present invention easy to use and economical as compared to other systems. For example, since the present invention is aqueous based, there is no need for expensive systems to handle VOC's used in other systems such as epoxy thermosets. In addition, most of the solvents can contact human skin without irritation allowing for ease of use in manufacturing.

F. Preferred Articles

Generally, preferred articles herein include preforms or containers having one or more coating layers. The coating layer or layers preferably provide some functionality such as barrier protection, UV protection, impact resistance, scuff resistance, blush resistance, chemical resistance, antimicrobial properties, and the like. The layers may be applied as multiple layers, each layer having one or more functional characteristics, or as a single layer containing one or more functional components. The layers are applied sequentially with each coating layer being partially or fully dried/cured prior to the next coating layer being applied.

A preferred substrate is a PET preform or container as described above. However, other substrate materials may also be utilized. Other suitable substrate materials include, but are not limited to, polyesters, polypropylene, polyethylene, polycarbonate, polyamides and acrylics.

For example, in one multiple layer article, the inner layer is a primer or base coat having functional properties for enhanced adhesion to PET, $O_2$ scavenging, UV resistance and passive barrier and the one or more outer coatings provide passive barrier and scuff resistance. In the descriptions herein with regard to coating layers, inner is taken as being closer to the substrate and outer is taken as closer to the exterior surface of the container. Any layers between inner and outer layers are generally described as "intermediate" or "middle". In other embodiments, multiple coated articles comprise an inner coating layer comprising an $O_2$ scavenger, an intermediate active UV protection layer, followed by an outer layer of the partially or highly cross-linked material. In another embodiment, multiple coated preforms comprise an inner coating layer comprising an $O_2$ scavenger, an intermediate $CO_2$ scavenger layer, an intermediate active UV protection layer, followed by an outer layer of partially or highly cross-linked material. These combinations provide a hard increased cross linked coating that is suitable for carbonated beverages such as beer. In another embodiment useful for carbonated soft drinks, the inner coating layer is a UV protection layer followed by an outer layer of cross linked material. Although the above embodiments have been described in connection with particular beverages, they may be used for other purposes and other layer configurations may be used for the referenced beverages.

In a related embodiment, the final coating and drying of the preform provides scuff resistance to the surface of the preform and finished container in that the solution or dispersion contains diluted or suspended paraffin or wax, slipping agent, polysilane or low molecular weight polyethylene to reduce the surface tension of the container.

G. Methods and Apparatus for Preparation of Coated Articles

Once suitable coating materials are chosen, the preform is preferably coated in a manner that promotes adhesion between the two materials. Although the discussion which follows is in terms of preforms, such discussion should not be taken as limiting, in that the methods and apparatus described may be applied or adapted for containers and other articles. Generally, adherence between coating materials and the preform substrate increases as the surface temperature of the preform increases. Therefore it is preferable to perform coating on a heated preform, although preferred coating materials will adhere to the preform at room temperature.

Plastics generally, and PET preforms specifically, have static electricity that results in the preforms attracting dust and getting dirty quickly. In a preferred embodiment the preforms are taken directly from the injection-molding machine and coated, including while still warm. By coating the preforms immediately after they are removed from the injection-molding machine, not only is the dust problem avoided, it is believed that the warm preforms enhance the coating process. However, the methods also allow for coating of preforms that are stored prior to coating. Preferably, the preforms are substantially clean, however cleaning is not necessary.

In a preferred embodiment an automated system is used. A preferred method involves entry of the preform into the system, dip, spray, or flow coating of the preform, optional removal of excess material, drying/curing, cooling, and ejection from the system. The system may also optionally include a recycle step. In one embodiment the apparatus is a single integrated processing line that contains two or more dip, flow, or spray coating units and two or more curing/drying units that produce a preform with multiple coatings. In another embodiment, the system comprises one or more coating modules. Each coating module comprises a self-contained processing line with one or more dip, flow, or spray coating units and one or more curing/drying units. Depending on the module configuration, a preform may receive one or more coatings. For example, one configuration may comprise three coating modules wherein the preform is transferred from one module to the next, in another configuration, the same three modules may be in place but the preform is transferred from the first to the third module skipping the second. This ability to switch between different module configurations allows for flexibility. In a further preferred embodiment either the modular or the integrated systems may be connected directly to a preform injection-molding machine and/or a blow-molding machine. The injection molding machine prepares preforms for use in the present invention.

The following describes a preferred embodiment of a coating system that is fully automated. This system is described in terms of currently preferred materials, but it is understood by one of ordinary skill in the art that certain parameters will vary depending on the materials used and the particular physical structure of the desired end-product preform. This method is described in terms of producing coated 24 gram preforms having about 0.05 to about 0.75 total grams of coating material deposited thereon, including about 0.07, 0.09, 0.10, 0.15, 0.20, 0.25, 0.30, 0.35, 0.40, 0.45, 0.50, 0.55, 0.60, 0.65, and 0.70 grams. In the method described below, the coating solution/dispersion is at a suitable temperature and viscosity to deposit about 0.06 to about 0.20 grams of coating material per coating layer on a 24 gram preform, also including about 0.07, 0.08, 0.09, 0.1, 0.11, 0.12, 0.13, 0.14, 0.15, 0.16. 0.17, 0.18, and 0.19 grams per coating layer on a 24 gram preform. Preferred depostion amounts for articles of varying sizes may be scaled according to the increase or decrease in surface area as compared to a 24 gram preform. Accordingly, articles other than 24 gram preforms may fall outside of the ranges stated above. Furthermore, in some embodiments, it may be desired to have a single layer or total coating amount on a 24 gram preform that lies outside of the ranges stated above.

The apparatus and methods may also be used for other similarly sized preforms and containers, or may adapted for other sizes of articles as will be evident to those skilled in the art in view of the discussion which follows. Currently preferred coating materials include, TPEs, preferably phenoxy type resins, more preferably PHAEs, including the BLOX resins noted supra. These materials and methods are given by way of example only and are not intended to limit the scope of the invention in any way.

1. Entry Into The System

The preforms are first brought into the system. An advantage of one preferred method is that ordinary preforms such as those normally used by those of skill in the art may be used. For example, 24 gram monolayer preforms of the type in common use to make 16 ounce bottles can be used without any alteration prior to entry into the system. In one embodiment the system is connected directly to a preform injection molding machine providing warm preforms to the system. In another embodiment stored preforms are added to the system by methods well known to those skilled in the art including those which load preforms into an apparatus for additional processing. Preferably the stored preforms are pre-warmed to about 100° F. to about 130° F., including about 120° F., prior to entry into the system. The stored preforms are preferably clean, although cleaning is not necessary. PET preforms are preferred, however other preform and container substrates can be used. Other suitable article substrates include, but are not limited to, various polymers such as polyesters, polyolefins, including polypropylene and polyethylene, polycarbonate, polyamides, including nylons, or acrylics.

2. Dip, Spray, or Flow Coating

Once a suitable coating material is chosen, it can be prepared and used for either dip, spray, or flow coating. The material preparation is essentially the same for dip, spray, and flow coating. The coating material comprises a solution/dispersion made from one or more solvents into which the resin of the coating material is dissolved and/or suspended.

The temperature of the coating solution/dispersion can have a drastic effect on the viscosity of the solution/dispersion. As temperature increases, viscosity decreases and vice versa. In addition, as viscosity increases the rate of material deposition also increases. Therefore temperature can be used as a mechanism to control deposition. In one embodiment using flow coating, the temperature of the solution/dispersion is maintained in a range cool enough to minimize curing of the coating material but warm enough to maintain a suitable viscosity. In one embodiment, the temperature is about 60° F. -80° F., including about 70° F. In some cases, solutions/dispersions that may be too viscous to use in spray or flow coating may be used in dip coating. Similarly, because the coating material may spend less time at an elevated temperature in spray coating, higher temperatures than would be recommended for dip or flow coating because of curing problems may be utilized in spray coating. In any case, a solution or dispersion may be used at any temperature wherein it exhibits suitable properties for the application. In preferred embodiments, a temperature control system is used to ensure constant temperature of the coating solution/dispersion during the application process. In certain embodiments, as the viscosity increases, the addition of water may decrease the viscosity of the solution/dispersion. Other embodiments may also include a water content monitor and/or a viscosity monitor that provides a signal when viscosity falls outside a desired range and/or which automatically adds water or other solvent to achieve viscosity within a desired range.

In a preferred embodiment, the solution/dispersion is at a suitable temperature and viscosity to deposit about 0.06 to about 0.2 grams per coat on a 24 gram preform, also including about 0.07, 0.08, 0.09, 0.1, 0.11, 0.12, 0.13, 0.14, 0.15, 0.16. 0.17, 0.18, and 0.19 grams per coating layer on a 24 gram preform. Preferred deposition amounts for articles of varying sizes may be scaled according to the increase or decrease in surface area as compared to a 24 gram preform. Accordingly, articles other than 24 gram preforms may fall outside of the ranges stated above. Furthermore, in some embodiments, it may be desired to have a single layer on a 24 gram preform that lies outside of the ranges stated above.

In one embodiment, coated preforms produced from dip, spray, or flow coating are of the type seen in FIG. 3. The coating 22 is disposed on the body portion 4 of the preform and does not coat the neck portion 2. The interior of the coated preform 16 is preferably not coated. In a preferred embodiment this is accomplished through the use of a holding mechanism comprising an expandable collet or grip mechanism that is inserted into the preform combined with a housing surrounding the outside of the neck portion of the preform. The collet expands thereby holding the preform in place between the collet and the housing. The housing covers the outside of the neck including the threading, thereby protecting the inside of the preform as well as the neck portion from coating.

In preferred embodiments, coated preforms produced from dip, spray, or flow coating produce a finished product with substantially no distinction between layers. Further, in dip and flow coating procedures, it has been found that the amount of coating material deposited on the preform decreases slightly with each successive layer.

A. Dip Coating

In a preferred embodiment, the coating is applied through a dip coating process. The preforms are dipped into a tank or other suitable container that contains the coating material. The dipping of the preforms into the coating material can be done manually by the use of a retaining rack or the like, or it may be done by a fully automated process. Although the apparatus shown in FIG. 14 depicts one embodiment of an automated flow coating unit, in certain embodiments utilizing automated dip coating, the position of the flow coater 86 would represent the positioning of the dip coating tank or other suitable container containing the coating material.

In a preferred embodiment, the preforms are rotating while being dipped into the coating material. The preform preferably rotates at a speed of about 30-80 RPM, more preferably about 40 RPM, but also including 50, 60, and 70 RPM. This allows for thorough coating of the preform. Other speeds may be used, but preferably not so high as to cause loss of coating material due to centrifugal forces.

The preform is preferably dipped for a period of time sufficient to allow for thorough coverage of the preform. Generally, this ranges from about 0.25 to about 5 seconds although times above and below this range are also included. Without wishing to be bound to any theory, it appears that longer residence time does not provide any added coating benefit.

In determining the dipping time and therefore speed, the turbidity of the coating material should also be considered. If the speed is too high the coating material may become wave-like and splatter causing coating defects. Another consideration is that many coating material solutions or dispersions form foam and/or bubbles which can interfere with the coating process. To avoid this interference, the dipping speed is preferably chosen to avoid excessive agitation of the coating material. If necessary anti-foam/bubble agents may be added to the coating solution/dispersion.

B. Spray Coating

In a preferred embodiment, the coating is applied through a spray coating process. The preforms are sprayed with a coating material that is in fluid connection with a tank or other suitable container that contains the coating material. The spraying of the preforms with the coating material can be done manually with the use of a retaining rack or the like, or it may be done by a fully automated process. Although the apparatus shown in FIG. 14 depicts one embodiment of an automated flow coating unit, in certain embodiments utilizing automated spray coating, the position of the flow coater 86 would represent the positioning of the spray coating apparatus.

In a preferred embodiment, the preforms are rotating while being sprayed with the coating material. The preform preferably rotates at a speed of about 30-80 RPM, more preferably about 40 RPM, but also including about 50, 60, and 70 RPM. Preferably, the preform rotates at least about 360° while proceeding through the coating spray. This allows for thorough coating of the preform. The preform may, however, remain stationary while spray is directed at the preform.

The preform is preferably sprayed for a period of time sufficient to allow for thorough coverage of the preform. The amount of time required for spraying depends upon several factors, which may include the spraying rate (volume of spray per unit time), the area encompassed by the spray, and the like.

The coating material is contained in a tank or other suitable container in fluid communication with the production line. Preferably a closed system is used in which unused coating material is recycled. In one embodiment, this may be accomplished by collecting any unused coating material in a coating material collector which is in fluid communication with the coating material tank. Many coating material solutions or dispersions form foam and/or bubbles which can interfere with the coating process. To avoid this interference, the coating material is preferably removed from the bottom or middle of the tank. Additionally, it is preferable to decelerate the material flow prior to returning to the coating tank to further reduce foam and/or bubbles. This can be done by means known to those of skill in the art. If necessary anti-foam/bubble agents may be added to the coating solution/dispersion.

In determining the spraying time and associated parameters such as nozzle size and configuration, the properties of the coating material should also be considered. If the speed is too high and/or the nozzle size incorrect, the coating material may splatter causing coating defects. If the speed is too slow or the nozzle size incorrect, the coating material may be applied in a manner thicker than desired. Suitable spray apparatus include those sold by Nordson Corporation (Westlake, Ohio). Another consideration is that many coating material solutions or dispersions form foam and/or bubbles which can interfere with the coating process. To avoid this interference, the spraying speed, nozzle used and fluid connections are preferably chosen to avoid excessive agitation of the coating material. If necessary anti-foam/bubble agents may be added to the coating solution/dispersion.

C. Flow Coating

In a preferred embodiment, the coating is applied through a flow coating process. The object of flow coating is to provide a sheet of material, similar to a falling shower curtain or waterfall, that the preform passes through for thorough coating. Advantageously, preferred methods of flow coating allow for a short residence time of the preform in the coating material. The preform need only pass through the sheet a period of time sufficient to coat the surface of the preform. Without wishing to be bound to any theory, it appears that longer residence time does not provide any added coating benefit.

Referring to FIGS. 14, 15, and 16 there are shown alternate views of non-limiting diagrams of one embodiment of a preferred flow coating process. In this embodiment, the top view of a system comprising a single flow coater 86 is shown. The preform enters the system 84 and then proceeds to the flow coater 86 wherein the preform 1 passes through the coating material waterfall (not illustrated). The coating material proceeds from the tank or vat 150 through the gap 155 in the tank down the angled fluid guide 160 where it forms a waterfall as it passes onto the preforms. Other embodiments may have fluid guides that are substantially horizontal. The gap 155 in the tank 150 may be widened or narrowed to adjust the flow of the material. The material is pumped from the reservoir (not illustrated) into the vat or tank 150 at a rate that maintains the coating material level above that of the gap 155. Advantageously, this configuration ensures a constant flow of coating material. The excess amount of material also dampens any fluid fluctuations due to the cycling of the pump.

In order to provide an even coating the preform is preferably rotating while it proceeds through the sheet of coating material. The preform preferably rotates at a speed of about 30-80 RPM, more preferably about 40 RPM, but also including 50, 60, and 70 RPM. Preferably, the preform rotates at least about two full rotations or 720° while being proceeding through the sheet of coating material. In one preferred embodiment, the preform is rotating and placed at an angle while it proceeds through the coating material sheet. The angle of the preform is preferably acute to the plane of the coating material sheet. This advantageously allows for thorough coating of the preform without coating the neck portion or inside of the preform. In another preferred embodiment, the preform 1 as shown in FIG. 16 is vertical, or perpendicular to the floor, while it proceeds through the coating material sheet. It has been found that as the coating material sheet comes into contact with the preform the sheet tends to creep up the wall of the preform from the initial point of contact. One of skill in the art can control this creep effect by adjusting parameters such as the flow rate, coating material viscosity, and physical placement of the coating sheet material relative to the preform. For example, as the flow increases the creep effect may also increase and possibly cause the coating material to coat more of the preform than is desirable. As another example, by decreasing the angle of the perform relative to the coating material sheet, coating thickness may be adjusted to retain more material at the center or body of the perform as the angle adjustment decreases the amount of material removed or displaced to the bottom of the preform by gravity. The ability to manipulate this creep effect advantageously allows for thorough coating of the preform without coating the neck portion or inside of the preform.

The coating material is contained in a tank or other suitable container in fluid communication with the production line in a closed system. It is preferable to recycle any unused coating material. In one embodiment, this may be accomplished by collecting the returning waterfall flow stream in a coating material collector which is in fluid communication with the coating material tank. Many coating material solutions or dispersions form foam and/or bubbles which can interfere with the coating process. To avoid this interference, the coating material is preferably removed from the bottom or middle of the tank. Additionally, it is preferable to decelerate the material flow prior to returning to the coating tank to further reduce foam and/or bubbles. This can be done by means known to those of skill in the art. If necessary anti-foam/bubble agents may be added to the coating solution/dispersion.

In choosing the proper flow rate of coating materials, several variables should be considered to provide proper sheeting, including coating material viscosity, flow rate velocity, length and diameter of the preform, line speed and preform spacing.

The flow rate velocity determines the accuracy of the sheet of material. If the flow rate is too fast or too slow, the material may not accurately coat the preforms. When the flow rate is too fast, the material may splatter and overshoot the production line causing incomplete coating of the preform, waste of the coating material, and increased foam and/or bubble problems. If the flow rate is too slow the coating material may only partially coat the preform.

The length and the diameter of the preform to be coated should also be considered when choosing a flow rate. The sheet of material should thoroughly cover the entire preform, therefore flow rate adjustments may be necessary when the length and diameter of preforms are changed.

Another factor to consider is the spacing of the preforms on the line. As the preforms are run through the sheet of material a so-called wake effect may be observed. If the next preform passes through the sheet in the wake of the prior preform it may not receive a proper coating. Therefore it is important to monitor the speed and center line of the preforms. The speed of the preforms will be dependant on the throughput of the specific equipment used.

3. Removal of Excess Material

Advantageously preferred methods provide such efficient deposition that virtually all of the coating on the preform is utilized (i.e. there is virtually no excess material to remove). However there are situations where it is necessary to remove excess coating material after the preform is coated by dip, spray or flow methods. Preferably, the rotation speed and gravity will work together to normalize the sheet on the preform and remove any excess material. Preferably, preforms are allowed to normalize for about 5 to about 15 seconds, more preferably about 10 seconds. If the tank holding the coating material is positioned in a manner that allows the preform to pass over the tank after coating, the rotation of the preform and gravity may cause some excess material to drip off of the preform back into the coating material tank. This allows the excess material to be recycled without any additional effort. If the tank is situated in a manner where the excess material does not drip back into the tank, other suitable means of catching the excess material and returning it to be reused, such as a coating material collector or reservoir in fluid communication with the coating tank or vat, may be employed.

Where the above methods are impractical due to production circumstances or insufficient, various methods and apparatus, such as a drip remover 88, known to those skilled in the art may be used to remove the excess material. See e.g. FIGS. 14, 15, and 16. For example, suitable drip removers include one or more of the following: a wiper, brush, sponge roller, air knife or air flow, which may be used alone or in conjunction with each other. Further, any of these methods may be combined with the rotation and gravity method described above. Preferably any excess material removed by these methods is recycled for further use.

4. Drying and Curing

After the preform 1 has been coated and any excess material removed 88, the coated preform is then dried and cured 90. The drying and curing process is preferably performed by infrared (IR) heating 90. See FIGS. 14, 15, 17A, and 17B. In one embodiment, a 1000 W quartz IR lamp 200 is used as the source. A preferred source is a General Electric Q1500 T3/CL Quartzline Tungsten-Halogen lamp. This particular source and equivalent sources may be purchased commercially from any of a number of sources including General Electric and Phillips. The source may be used at full capacity, or it may be used at partial capacity such as at about 50%, about 65%, about 75% and the like. Preferred embodiments may use a single lamp or a combination of multiple lamps. For example, six IR lamps may be used at 70% capacity.

Preferred embodiments may also use lamps whose physical orientation with respect to the preform is adjustable. As shown in FIGS. 17A and 17B, the lamp position 200 may be adjusted 220 to position the lamp closer to or farther away from the preform. For example, in one embodiment with multiple lamps, it may be desirable to move one or more of the lamps located below the bottom of the preform closer to the preform. This advantageously allows for thorough curing of the bottom of the preform. Embodiments with adjustable lamps may also be used with preforms of varying widths. For example, if a preform is wider at the top than at the bottom, the lamps may be positioned closer to the preform at the bottom of the preform to ensure even curing. The lamps are preferably oriented so as to provide relatively even illumination of all surfaces of the coating.

In other embodiments reflectors are used in combination with IR lamps to provide thorough curing. In preferred embodiments lamps 200 are positioned on one side of the processing line while one or more reflectors 210 230 are located on the opposite side of or below the processing line. This advantageously reflects the lamp output back onto the preform allowing for a more thorough cure. More preferably an additional reflector 210 is located below the preform to reflect heat from the lamps upwards towards the bottom of the preform. This advantageously allows for thorough curing of the bottom of the preform. In other preferred embodiments various combinations of reflectors may be used depending on the characteristics of the articles and the IR lamps used. More preferably reflectors are used in combination with the adjustable IR lamps described above.

FIG. 17 depicts a view of one non-limiting embodiment of a preferred IR drying/curing unit. On one side of the processing line there is shown a series of lamps 200. Below the preforms there is shown an angled reflector 210 which reflects heat towards the bottom of the preforms for more thorough curing. Opposite to the lamps is a semicircular reflector 230 which reflects the IR heat back onto the preforms allowing for a more thorough and efficient cure. FIG. 17B is an enlarged section of the lamp which demonstrates an embodiment where the lamp placement is adjustable 220. The lamps may be moved closer to or farther away from the preform allowing for maximum drying/curing flexibility.

In addition, the use of infrared heating allows for the thermoplastic epoxy (for example PHAE) coating to dry without overheating the PET substrate and can be used during preform heating prior to blow molding, thus making for an energy efficient system. Also, it has been found that use of IR heating can reduce blushing and improve chemical resistance.

Although this process may be performed without additional air, it is preferred that IR heating be combined with forced air. The air used may be hot, cold, or ambient. The combination of IR and air curing provides the unique attributes of superior chemical, blush, and scuff resistance of preferred embodiments. Further, without wishing to be bound to any particular theory, it is believed that the coating's chemical resistance is a function of crosslinking and curing. The more thorough the curing, the greater the chemical resistance.

In determining the length of time necessary to thoroughly dry and cure the coating several factors such as coating material, thickness of deposition, and preform substrate should be considered. Different coating materials cure faster or slower than others. Additionally, as the degree of solids increases, the cure rate decreases. Generally, for IR curing, 24 gram preforms with about 0.05 to about 0.75 grams of coating material the curing time is about 5 to 60 seconds, although times above and below this range may also be used.

Another factor to consider is the surface temperature of the preform as it relates to the glass transition temperature ($T_g$) of the substrate and coating materials. Preferably the surface temperature of the coating exceeds the $T_g$ of the coating materials without heating the substrate above the substrate $T_g$ during the curing/drying process. This provides the desired film formation and/or crosslinking without distorting the preform shape due to overheating the substrate. For example, where the coating material has a higher $T_g$ than the preform substrate material, the preform surface is preferably heated to a temperature above the $T_g$ of the coating while keeping the substrate temperature at or below the substrate $T_g$. One way of regulating the drying/curing process to achieve this balance is to combine IR heating and air cooling, although other methods may also be used.

An advantage of using air in addition to IR heating is that the air regulates the surface temperature of the preform thereby allowing flexibility in controlling the penetration of the radiant heat. If a particular embodiment requires a slower cure rate or a deeper IR penetration, this can be controlled with air alone, time spent in the IR unit, or the IR lamp frequency. These may be used alone or in combination.

Preferably, the preform rotates while proceeding through the IR heater. The preform preferably rotates at a speed of about 30-80 RPM, more preferably about 40 RPM. If the rotation speed is too high, the coating will spatter causing uneven coating of the preform. If the rotation speed is too low, the preform dries unevenly. More preferably, the preform rotates at least about 360° while proceeding through the IR heater. This advantageously allows for thorough curing and drying.

In other preferred embodiments, Electron Beam Processing may be employed in lieu of IR heating or other methods. Electron Beam Processing (EBP) has not been used for curing of polymers used for and in conjunction with injection molded performs and containers primarily due to its large size and relatively high cost. However recent advances in this technology, are expected to give rise to smaller less expensive machines. EBP accelerators are typically described in terms of their energy and power. For example, for curing and crosslinking of food film coatings, accelerators with energies of 150-500 keV are typically used.

EBP polymerization is a process in which several individual groups of molecules combine together to form one large group (polymer). When a substrate or coating is exposed to highly accelerated electrons, a reaction occurs in which the chemical bonds in the material are broken and a new, modified molecular structure is formed. This polymerization causes significant physical changes in the product, and may result in desirable characteristics such as high gloss and abrasion resistance. EBP can be a very efficient way to initiate the polymerization process in many materials.

Similar to EBP polymerization, EBP crosslinking is a chemical reaction, which alters and enhances the physical characteristics of the material being treated. It is the process by which an interconnected network of chemical bonds or links develop between large polymer chains to form a stronger molecular structure. EBP may be used to improve thermal, chemical, barrier, impact, wear and other properties of inexpensive commodity thermoplastics. EBP of crosslinkable plastics can yield materials with improved dimensional stability, reduced stress cracking, higher set temperatures, reduced solvent and water permeability and improved thermomechanical properties.

The effect of the ionizing radiation on polymeric material is manifested in one of three ways: (1) those that are molecular weight-increasing in nature (crosslinking); (2) those that are molecular weight-reducing in nature (scissioning); or (3), in the case of radiation resistant polymers, those in which no significant change in molecular weight is observed. Certain polymers may undergo a combination of (1) and (2). During irradiation, chain scissioning occurs simultaneously and competitively with crosslinking, the final result being determined by the ratio of the yields of these reactions. Polymers containing a hydrogen atom at each carbon atom predominantly undergo crosslinking, while for those polymers containing quaternary carbon atoms and polymers of the —$CX_2$—$CX_2$— type (when X=halogen), chain scissioning predominates. Aromatic polystyrene and polycarbonate are relatively resistant to EBP.

For polyvinylchloride, polypropylene and PET, both directions of transformation are possible; certain conditions exist for the predominance of each one. The ratio of crosslinking to scissioning may depend on several factors, including total irradiation dose, dose rate, the presence of oxygen, stabilizers, radical scavengers, and/or hindrances derived from structural crystalline forces.

Overall property effects of crosslinking can be conflicting and contrary, especially in copolymers and blends. For example, after EBP, highly crystalline polymers like HDPE may not show significant change in tensile strength, a property derived from the crystalline structure, but may demonstrate a significant improvement in properties associated with the behavior of the amorphous structure, such as impact and stress crack resistance.

Aromatic polyamides (Nylons) are considerably responsive to ionizing radiation. After exposure the tensile strength of aromatic polyamides does not improve, but for a blend of aromatic polyamides with linear aliphatic polyamides, an increase in tensile strength is derived together with a substantial decrease in elongation.

EBP may be used as an alternative to IR for more precise and rapid curing of TPE coatings applied to preforms and containers.

It is believed that when used in conjunction with dip, spray, or flow coating, EBP may have the potential to provide lower cost, improved speed and/or improved control of crosslinking when compared to IR curing. EBP may also be beneficial in that the changes it brings about occur in solid state as opposed to alternative chemical and thermal reactions carried out with melted polymer.

In other preferred embodiments, gas heaters, UV radiation, and flame may be employed in addition to or in lieu of IR or EPB curing. Preferably the drying/curing unit is placed at a sufficient distance or isolated from the coating material tank and/or the flow coating sheet as to avoid unwanted curing of unused coating material.

5. Cooling

The preform is then cooled. The cooling process combines with the curing process to provide enhanced chemical, blush and scuff resistance. It is believed that this is due to the removal of solvents and volatiles after a single coating and between sequential coatings.

In one embodiment the cooling process occurs at ambient temperature. In another embodiment, the cooling process is accelerated by the use of forced ambient or cool air.

There are several factors to consider during the cooling process. It is preferable that the surface temperature of the preform is below the $T_g$ of the lower of the $T_g$ of the preform substrate or coating. For example, some coating materials have a lower $T_g$ than the preform substrate material, in this example the preform should be cooled to a temperature below the $T_g$ of the coating. Where the preform substrate has the lower $T_g$ the preform should be cooled below the $T_g$ of the preform substrate.

Cooling time is also affected by where in the process the cooling occurs. In a preferred embodiment multiple coatings are applied to each preform. When the cooling step is prior to a subsequent coating, cooling times may be reduced as elevated preform temperature is believed to enhance the coating process. Although cooling times vary, they are generally about 5 to 40 seconds for 24 gram preforms with about 0.05 to about 0.75 grams of coating material.

6. Ejection From System

In one embodiment, once the preform has cooled it will be ejected from the system and prepared for packaging. In another embodiment the preform will be ejected from the coating system and sent to a blow-molding machine for further processing. In yet another embodiment, the coated preform is handed off to another coating module where a further coat or coats are applied. This further system may or may not be connected to further coating modules or a blow molding-machine.

7. Recycle

Advantageously, bottles made by, or resulting from, a preferred process described above may be easily recycled. Using current recycling processes, the coating can be easily removed from the recovered PET. For example, a polyhydroxyaminoether based coating applied by dip coating and cured by IR heating can be removed in 30 seconds when exposed to an 80° C. aqueous solution with a pH of 12. Additionally, aqueous solutions with a pH equal to or lower than 4 can be used to remove the coating. Variations in acid salts made from the polyhydroxyaminoethers may change the conditions needed for coating removal. For example, the acid salt resulting from the acetic solution of a polyhydroxyaminoether resin can be removed with the use of an 80° C. aqueous solution at a neutral pH. Alternatively, the recycle methods set forth in U.S. Pat. No. 6,528,546, entitled Recycling of Articles Comprising Hydroxy-phenoxyether Polymers, may also be used. The methods disclosed in this application are herein incorporated by reference.

8. Example

A lab scale flow coating system was used to coat 24 gram PET preforms. A system, as illustrated in FIGS. 14 through 16 was used, and comprised a single flow coating unit with an IR curing/drying unit. The preforms were manually loaded onto the processing line. The collets used to hold the 24 gram preforms were spaced 1.5" on center from each other. It was found that this distance provided the proper spacing to avoid any wake effect while the preforms passed through the coating waterfall or sheet. The coating material was pumped into a tank using a non-shearing pump. The coating material then flowed out of the tank forming a waterfall or sheet that coated the preforms as they passed through the sheet. The preforms moved along the line at a rate of three inches per second in order to ensure two full rotations while passing through the coating sheet. Once through the sheet the line speed allowed the preforms to drip for approximately 10 seconds before passing over a sponge roller to remove an excess coating material from the bottom of the preform. The preforms then moved into the IR curing/drying unit. Five 1000 W General Electric Q1500 T3/CL Quartzline Tungsten-Halogen lamps at 60% capacity were used as the source. The lamps were positioned at 0.6 inches on the centerline. The preforms remained in the IR curing/drying unit for about 10 seconds. As the preforms moved out of the curing/drying unit they were cooled for about 10 seconds with forced ambient air before being removed from the system.

The coating material used in this example was a PHAE dispersion, BLOX® XUR 588-29 (from The Dow Chemical Company), having 30% solids. The average deposition (single layer on a 24 gram preform) was about 97 mg.

The various methods and techniques described above provide a number of ways to carry out the invention. Of course, it is to be understood that not necessarily all objectives or advantages described may be achieved in accordance with any particular embodiment described herein.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof Accordingly, the invention is not intended to be limited by the specific disclosures of preferred embodiments herein.

What is claimed is:

1. An apparatus for making coated articles comprising:
   an article conveyor that transports said articles through a flow coating system; and
   a flow coating system comprising:
      a first flow coating unit which comprises:
         a first tank or vat containing an aqueous solution/dispersion coating material wherein said first tank or vat is in fluid communication with a first fluid guide;
         wherein said coating material flows off of said first fluid guide forming a sheet or falling shower curtain which is applied onto said articles;
         a first coating material collector which receives unused coating material;
      a first curing/drying unit which comprises:
         a first oven or chamber in which a first infrared heating lamp and a first fan or blower are located;
         wherein said articles are moved through the first oven or chamber by the article conveyor;
      a second flow coating unit which comprises:
         a second tank or vat containing an aqueous solution/dispersion coating material wherein said second tank or vat is in fluid communication with a second fluid guide;
         wherein said coating material flows off of said second fluid guide forming a sheet or falling shower curtain which is applied onto said articles;
         a second coating material collector which receives unused coating material; and
      a second curing/drying unit which comprises:
         a second oven or chamber in which a second infrared heating lamp and a second fan or blower located;
         wherein said articles are moved through the second oven or chamber by the article conveyor;
      wherein at least one of the aqueous solution/dispersion coating materials comprises a thermoplastic epoxy resin;
      and further wherein the article conveyor rotates said articles while transporting them through at least one of said first and second flow coating units and at least one of said first and second curing/drying units.

2. The apparatus of claim 1 wherein a third flow coating unit and a third curing/drying unit are included.

3. The apparatus of claim 1 wherein a single integrated processing line comprises at least said first and second flow coating units and at least said first and second curing/drying units wherein the article conveyor transports the articles through the processing line.

4. The apparatus of claim 1 comprising one or more coating modules;
   wherein each coating module comprises:
      a self-contained processing line comprising at least one of said first and second flow coating units and at least one of said first and second curing/drying units; and
   wherein the article conveyor can transport the articles into, within, and between coating modules and eject the article from the system.

5. The apparatus of claim 1 wherein at least one of said first and second fluid guides is angled.

6. The apparatus of claim 1 wherein at least one of said first and second coating material collectors is in fluid communication with at least one of said first and second tanks or vats thereby recycling and reusing any excess material.

7. The apparatus of claim 1 wherein said first tank or vat and said second tank or vat comprise a single, common tank or vat.

8. The apparatus of claim 1 wherein said first and second ovens or chambers comprise a single, common oven or chamber.

9. The apparatus of claim 1 further comprising a drip remover positioned between at least one of said first and second coating material collectors and at least one of said first and second curing/drying units.

10. The apparatus of claim 9 wherein said drip remover comprises one or more of the following: wiper, brush, sponge roller, air knife or air flow.

11. The apparatus of claim 1 wherein at least one of said first and second fans or blowers comprise means for providing forced air at a temperature between 10 C to about 50 C.

12. The apparatus of claim 1 wherein at least one of said first and second fans or blowers comprise means for providing forced air at a temperature sufficient to prevent undesirable shrinkage of the article while maximizing the removal of liquids without prematurely sealing the surface and entrapping unexpelled liquid.

13. The apparatus of claim 1 wherein said article is a preform.

14. The apparatus of claim 13, wherein the preform comprises a material selected from the group consisting of polyesters, polyolefins, polycarbonates, polyamides and acrylics.

15. The apparatus of claim 13, wherein the preform comprises amorphous or semi crystalline polyethylene terephthalate.

* * * * *